(12) United States Patent
Landry et al.

(10) Patent No.: US 12,358,618 B1
(45) Date of Patent: Jul. 15, 2025

(54) HOLLOW MULTI-BLADE ROTOR, ASSEMBLY, AND METHOD OF MANUFACTURE

(71) Applicant: Textron Innovations Inc., Providence, RI (US)

(72) Inventors: Francois Landry, St-Hippolyte (CA); Olivier Blanc, Pointe-Calumet (CA); Daniel Del Rossi, LaSalle (CA); Maxime Lapalme, St-Lin-Laurentides (CA)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/412,159

(22) Filed: Jan. 12, 2024

(51) Int. Cl.
| | |
|---|---|
| *B64C 27/32* | (2006.01) |
| *B29D 99/00* | (2010.01) |
| *B64C 27/473* | (2006.01) |
| *B64C 27/48* | (2006.01) |
| *B64U 30/29* | (2023.01) |
| *F01D 5/14* | (2006.01) |
| *F01D 5/28* | (2006.01) |

(52) U.S. Cl.
CPC .......... *B64C 27/32* (2013.01); *B29D 99/0028* (2013.01); *B64C 27/473* (2013.01); *B64C 27/48* (2013.01); *F01D 5/147* (2013.01); *F01D 5/282* (2013.01); *B64C 2027/4736* (2013.01); *B64U 30/29* (2023.01)

(58) Field of Classification Search
CPC ....... B64C 11/00; B64C 11/001; B64C 11/02; B64C 11/14; B64U 30/20; B64U 30/29; F01D 5/147; F04D 25/088; F04D 29/325; F04D 29/329
See application file for complete search history.

(56) References Cited

U.S. PATENT DOCUMENTS

| | | | | |
|---|---|---|---|---|
| 1,346,508 A | * | 7/1920 | Olhovsky | B64C 11/04 29/889.6 |
| 1,372,076 A | * | 3/1921 | Luense | B64C 11/04 219/104 |
| 1,463,556 A | * | 7/1923 | Reed | B64C 11/04 29/889.6 |
| 1,488,894 A | * | 4/1924 | Porter | B64C 11/24 29/889.6 |
| 1,518,410 A | * | 12/1924 | Reed | B64C 11/16 416/240 |
| 2,335,394 A | * | 11/1943 | Devore | B64C 11/22 416/241 A |

(Continued)

FOREIGN PATENT DOCUMENTS

| | | | |
|---|---|---|---|
| DE | 375598 C | * | 5/1923 |
| GB | 191504068 A | * | 6/1919 |

*Primary Examiner* — Christopher R Legendre

(74) *Attorney, Agent, or Firm* — Whitaker Chalk Swindle & Schwartz PLLC; Enrique Sanchez, Jr.; Juan Vasquez

(57) ABSTRACT

A hollow multi-blade rotor, assembly, and method of manufacture thereof. A hollow multi-blade rotor can include a hollow hub area configured to couple the hollow multi-blade rotor to a motor. The hollow hub area can include a main hub aperture and a plurality of bolt apertures. The hollow multi-blade rotor can further include a plurality of hollow blades and an internal hollow cavity that runs continuously through the plurality of hollow blades and the hollow hub area. The hollow hub area and the plurality of hollow blades can be a unitary member.

9 Claims, 25 Drawing Sheets

(56) References Cited

U.S. PATENT DOCUMENTS 2,704,130 A * 3/1955 Cox .................. F04D 25/166
                                                416/91
4,806,077 A * 2/1989 Bost .................. B64C 27/473
                                                416/144

* cited by examiner

HOLLOW MULTI-BLADE ROTOR, ASSEMBLY, AND METHOD OF MANUFACTURE

TECHNICAL FIELD

The present disclosure relates generally to rotor blades, hubs, and assemblies, and more particularly to a hollow multi-blade rotor, assembly, and method of manufacture.

BACKGROUND

Rotors and propellers, especially those that are larger than those used on small unmanned aerial vehicles (UAVs), usually consist of an assembly of individual blades that are each connected to a central hub. For example, a typical rotor may consist of two individual blades that are coupled to a central hub with bolts, where a rotor/propeller is an assembly of blades and a hub or a single solid machined part. While such multi-component configurations permit easier manufacturing of blade components and hubs, such configurations are typically heavier than desired due to assembly requirements. For example, for short layups, resin injection can be used to fill the gaps, and for long layups, larger stress safety margins can be used to accept wrinkles. However, both solutions result in overweight parts.

SUMMARY

The present disclosure achieves technical advantages as a hollow multi-blade rotor, assembly, and method of manufacture. In some embodiments, a hollow multi-blade rotor (or propeller) can include a hollow hub area configured to couple the hollow multi-blade rotor to a motor. The hollow hub area can include a main hub aperture and a plurality of bolt apertures. The hollow multi-blade rotor can further include a plurality of hollow blades and an internal hollow cavity that runs continuously through the plurality of hollow blades and the hollow hub area. In certain embodiments, the hollow hub area and/or one or more of the hollow blades can be a single unitary piece (member).

In some embodiments, a hub system can be configured to couple a hollow rotor to a motor includes a first hub fitting. The first hub fitting can include a first tubular member, a first flange, and a first plurality of bolt apertures located in the first flange. The first tubular member can include a first circular ledge and a first end portion having an inner diameter that is larger than an inner diameter of the first circular ledge. The hub system can further include a second hub fitting. The second hub fitting can include a second tubular member, a second flange, and a second plurality of bolt apertures located in the second flange. The second tubular member can include a second circular ledge and a second end portion having an outer diameter that is smaller than an outer diameter of the second circular ledge. The hub system can further include a plurality of bolts configured to couple the hollow rotor to the motor; wherein the outer diameter of the second end portion of the second tubular member is configured to fit inside the inner diameter of the first end portion of the first tubular member such that the second circular ledge contacts the first end portion of the first tubular member, thereby preventing deformation of the hollow rotor when the plurality of bolts couples the hollow rotor to the motor through the first and second plurality of bolt apertures.

In some embodiments, a method of manufacturing a hollow multi-blade rotor includes placing a top skin layup onto a top mold and placing a bottom skin layup onto a bottom mold. In certain embodiments, the hollow multi-blade rotor can be a unitary piece. The method can further include placing a first edge layup along a first edge of the bottom skin layup in the bottom mold and placing a second edge layup along a second edge of the bottom skin layup in the bottom mold. The method can further include placing an inflatable bladder onto the bottom skin layup in the bottom mold and then wrapping the first and second edge layups around edges of the bladder. The method can further include securing the top mold with the top skin layup onto the bottom mold and then inflating the inflatable bladder to a predetermined pressure. The method can further include applying heat to the top and bottom molds after inflating the bladder, thereby curing the top and bottom skin layups and the first and second edge layups into a shape of the hollow multi-blade rotor.

In some embodiments, a system for manufacturing a hollow multi-blade rotor can include a first mold and a second mold. In certain embodiments, the hollow multi-blade rotor can be a unitary piece. The first mold can include a first continuous contoured surface that includes a first region, a second region, and a third region. The first region can be configured to form an upper surface of a first hollow blade. The second region can be configured to form an upper surface of a second hollow blade. The third region can be configured to form an upper surface of a hollow hub area and includes an aperture. The second mold can include a second continuous contoured surface that includes a fourth region, a fifth region, and a sixth region. The fourth region can be configured to form a lower surface of the first hollow blade. The fifth region can be configured to form a lower surface of the second hollow blade. The sixth region can be configured to form a lower surface of the hollow hub area.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1A:
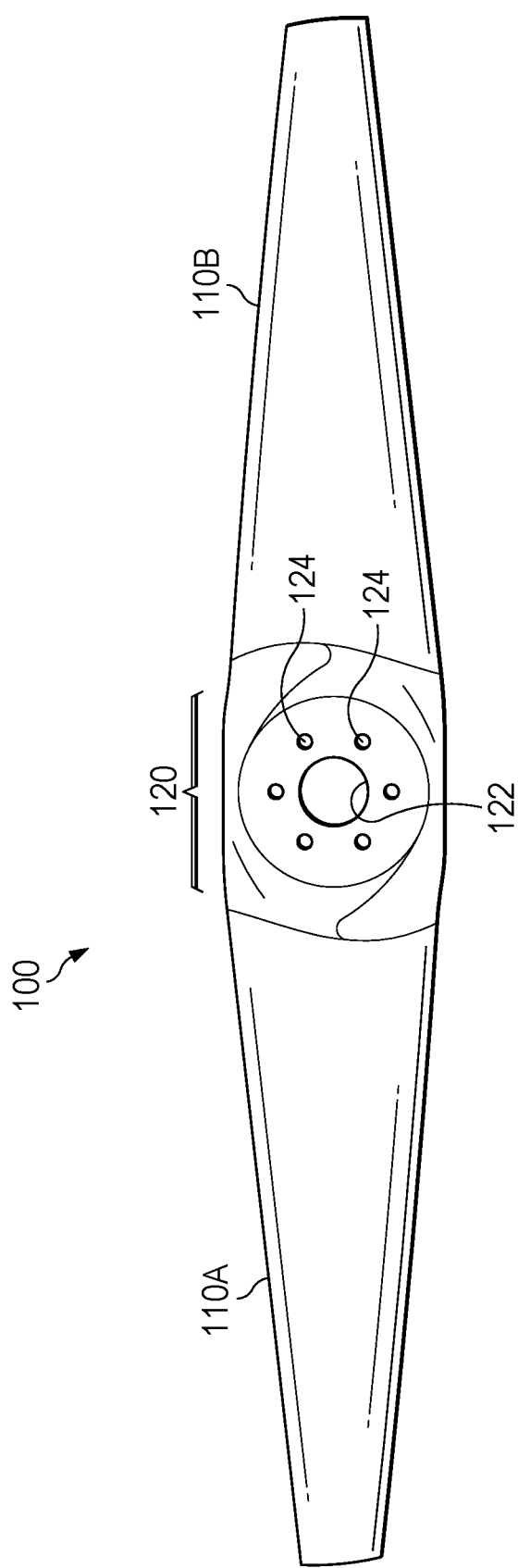
FIGS. 1A-1B illustrate various views of a hollow multi-blade rotor, according to certain embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Rotors and propellers, especially those that are larger than those used on small unmanned aerial vehicles (UAVs), usually consist of an assembly of individual blades that are each connected to a central rotor hub. For example, a typical rotor may consist of two individual blades that are coupled to a central rotor hub with bolts. The rotor assembly may then be coupled to the motor. While such multi-component configurations permit easier manufacturing of blade components and hubs, such configurations are typically heavier than desired due to assembly requirements.

To address these and other problems associated with typical multi-component rotor assemblies, the enclosed embodiments provide hollow one-piece multi-blade rotor systems, apparatuses, manufacturing methods, and manufacturing tools. In general, the hollow one-piece multi-blade rotor of the disclosed embodiments includes a hollow hub area and a plurality of hollow blades that are formed as a single member (i.e., one piece as opposed to multiple separate pieces that are manufactured separately and then coupled together with fasteners). The hollow hub area is configured to couple the hollow multi-blade rotor to a motor and includes a main hub aperture and a plurality of bolt apertures. The hollow one-piece multi-blade rotor further includes an internal hollow cavity that runs continuously through the plurality of blades and the hub area. The internal hollow cavity can be devoid of any filler material. By providing a hollow one-piece multi-blade rotor, embodiments of the disclosure provide significant weight savings over typical rotors. This may improve the efficiency and range of aircraft such as VTOLs.

Figure 1B:
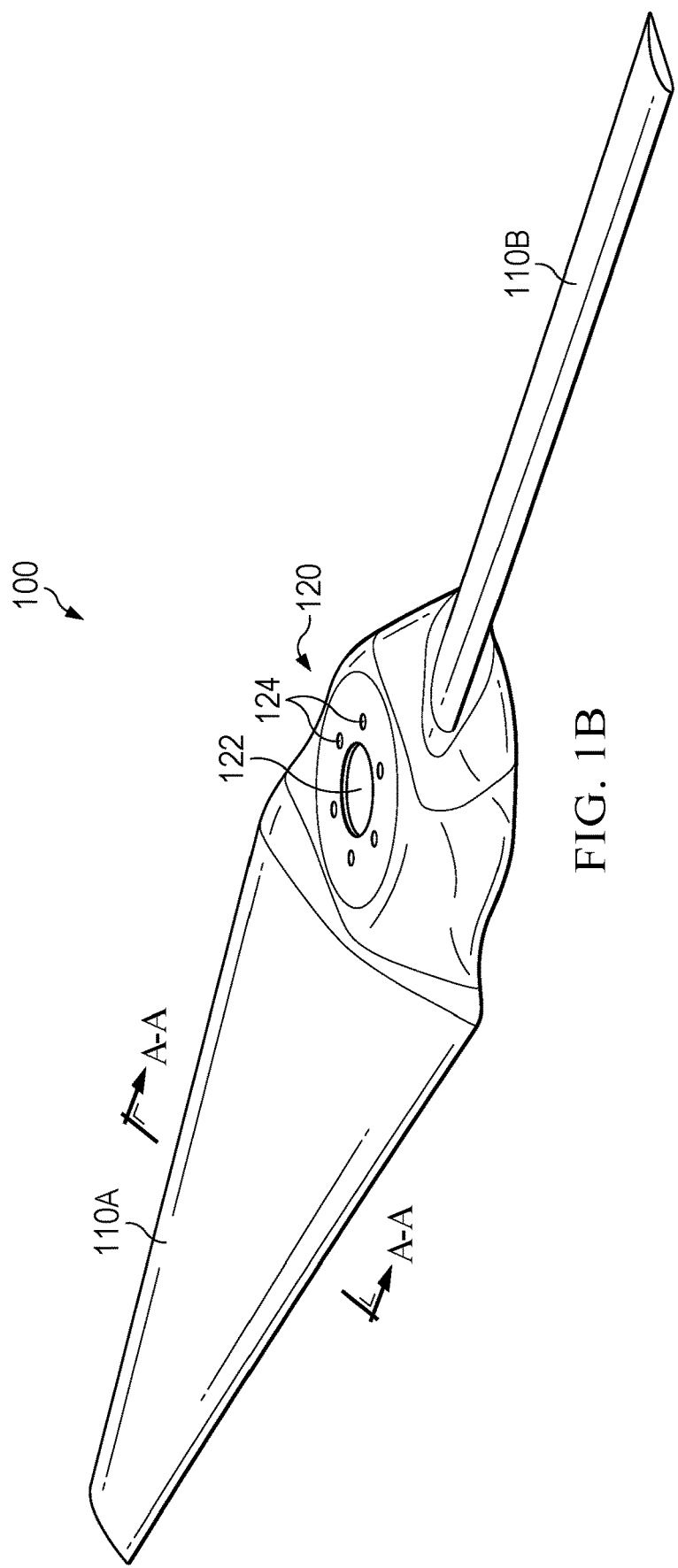

FIGS. 1A-1B illustrate various views of a hollow multi-blade rotor 100, according to certain embodiments. Hollow multi-blade rotor 100 includes multiple hollow blades 110 and a hollow hub area 120. Hollow hub area 120 includes a main hub aperture 122 and bolt apertures 124. While a specific number of hollow blades 110 and bolt apertures 124 are illustrated in FIGS. 1A and 1B, other embodiments may include other amounts of hollow blades 110 and bolt apertures 124.

Figure 2:
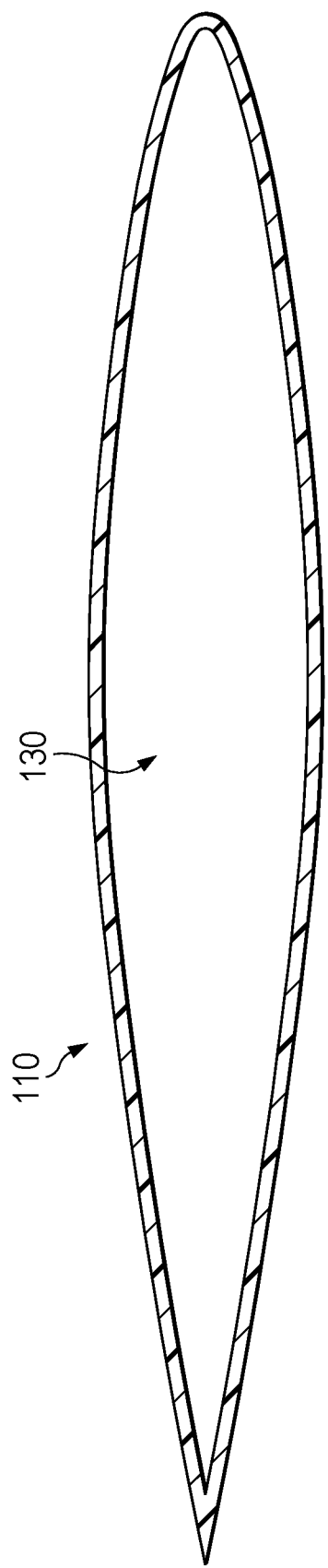
FIG. 2 illustrates a cross sectional view of the hollow multi-blade rotor of FIGS. 1A-1B, according to certain embodiments.

Hollow blades 110 can be fixed-pitch blades that create thrust when hollow multi-blade rotor 100 is rotated by a motor. In some embodiments, hollow multi-blade rotor 100 includes two hollow blades 110 as illustrated in the included figures: a first hollow fixed-pitch blade 110A and a second hollow fixed-pitch blade 110B. In other embodiments, hollow multi-blade rotor 100 may include any other appropriate number of hollow blades 110 (e.g., three, four, five, etc.) In general, hollow blades 110 include an internal hollow cavity 130 as illustrated in FIG. 2 that reduces the overall weight of hollow multi-blade rotor 100. FIG. 2 illustrates a cross sectional view of hollow blade 110 at cut A-A of FIG. 1B and illustrates internal hollow cavity 130. In some embodiments, internal hollow cavity 130 is devoid of filler material (e.g., foam and the like) and instead is filled with air. In some embodiments, hollow blades 110 are formed from carbon fiber composite materials in a layup process as described in more detail below in reference to FIG. 7. In some embodiments, hollow blades 110 include edge layups 140 as illustrated and described below in reference to FIG. 4.

Hollow hub area 120 is generally configured to couple hollow multi-blade rotor 100 to a motor (not illustrated). Hollow hub area 120, like hollow blades 110, may be devoid of any fillers (e.g., foam and the like). In some embodiments, hollow hub area 120 includes main hub aperture 122. In some embodiments, main hub aperture 122 is circular in shape as illustrated and enables upper hub fitting 510 and lower hub fitting 520 to be coupled together as described below. In other embodiments, main hub aperture 122 may have any other appropriate shape.

Hollow hub area 120 may include multiple bolt apertures 124 that permit bolts to couple hollow multi-blade rotor 100 to a motor. For example, coupling bolts 530 (illustrated in FIGS. 5A-5B) may be used in conjunction with upper hub fitting 510 and lower hub fitting 520 to couple hollow multi-blade rotor 100 to a motor, as described in more detail below. While the illustrated embodiments include six bolt apertures 124, other embodiments may include any other appropriate number of bolt apertures 124.

Figure 3:
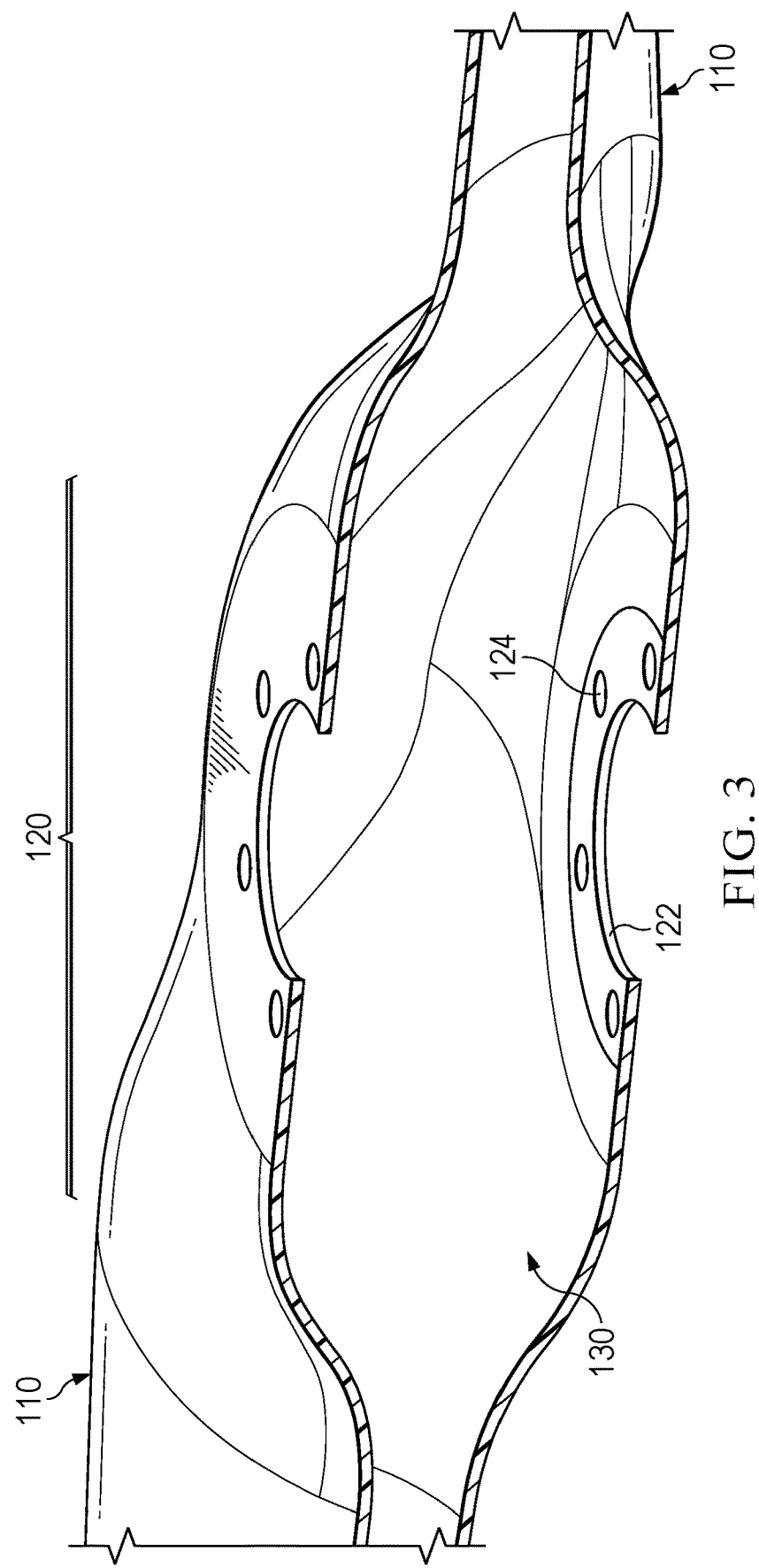
FIG. 3 illustrates a cross sectional view of the hub area of the hollow multi-blade rotor of FIGS. 1A-1B, according to certain embodiments.

FIG. 3 illustrates a cross sectional view of hollow hub area 120, according to certain embodiments. This figure illustrates how hollow blades 110 and hollow hub area 120 are formed to be a single unit/member (i.e., one piece as opposed to multiple separate pieces that are manufactured separately and then coupled together with fasteners). Unlike typical rotors where blades are attached to a solid hub using bolts, hollow multi-blade rotor 100 may be formed in molds (as described below) using composites such as carbon fiber in order to form hollow blades 110 and hollow hub area 120 as a single unit, thereby eliminating the need for fastening hollow blades 110 to hollow hub area 120. This enables hollow multi-blade rotor 100 to be lighter and more efficient than typical rotors. FIG. 3 additionally illustrates how internal hollow cavity 130 runs continuously through the hollow multi-blade rotor 100 and hollow hub area 120. That is, hollow multi-blade rotor 100 does not include separate blades that are manufactured separately and then subsequently attached to a solid hub. Instead, hollow blades 110 and hollow hub area 120 are formed as a single unit, thereby creating internal hollow cavity 130 that runs continuously through the hollow multi-blade rotor 100 and hollow hub area 120.

Figure 4:
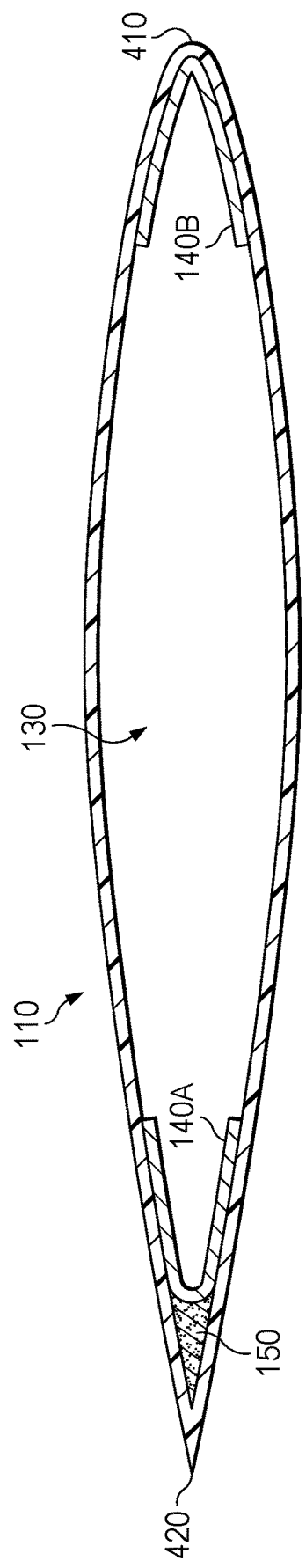
FIG. 4 illustrates a cross sectional view of a hollow multi-blade rotor that includes internal edge layups, according to certain embodiments.

In some embodiments, hollow multi-blade rotor 100 includes additional internal components to strengthen vital areas of hollow multi-blade rotor 100. For example, FIG. 4 illustrates a cross sectional view of a hollow multi-blade rotor 100 that includes internal edge layups 140 to strengthen edges of hollow multi-blade rotor 100, according to certain embodiments. In some embodiments, hollow multi-blade rotor 100 includes a first edge layup 140A and a second edge layup 140B. Edge layups 140 (e.g., 140A and 140B) are located internal to hollow multi-blade rotor 100 and may each be single-piece units that span from the outer tip (or near the outer tip) of one hollow blade 110, through hollow hub area 120, and to the outer tip (or near the outer tip) of opposite the hollow blade 110. In these embodiments, one end portion of each edge layup 140 is adjacent to a leading edge of one hollow blade 110 while an opposite end portion of the same edge layup 140 is adjacent to a trailing edge of the opposite hollow blade 110. For example, as illustrated in FIG. 4, one end portion of edge layup 140B is adjacent to a leading edge 410 of one hollow blade 110 while an opposite end portion of the same edge layup 140B is adjacent to a trailing edge of the opposite hollow blade 110 (not illustrated in FIG. 4). At the same time, one end portion of edge layup 140A is adjacent to a trailing 420 of hollow blade 110 while an opposite end portion of the same edge layup 140A is adjacent to a leading edge of the opposite hollow blade 110 (not illustrated in FIG. 4). Additional details about edge layups 140 and how they are formed and placed within hollow multi-blade rotor 100 are discussed in more detail below in reference to FIG. 7.

In embodiments that include edge layups 140, hollow multi-blade rotor 100 may additionally include edge filler 150 between edge layups 140 and edges of hollow blades 110 (i.e., internal to hollow blades 110 but outside internal hollow cavity 130). For example, as illustrated in FIG. 4, hollow multi-blade rotor 100 may include edge filler 150 between trailing edge 420 and edge layup 140A. Edge filler 150 may be made of any suitable material (e.g., foam, epoxy resin, etc.) in order to strengthen edges of hollow blades 110, especially sharp edges such as trailing edge 420.

Figure 5A:
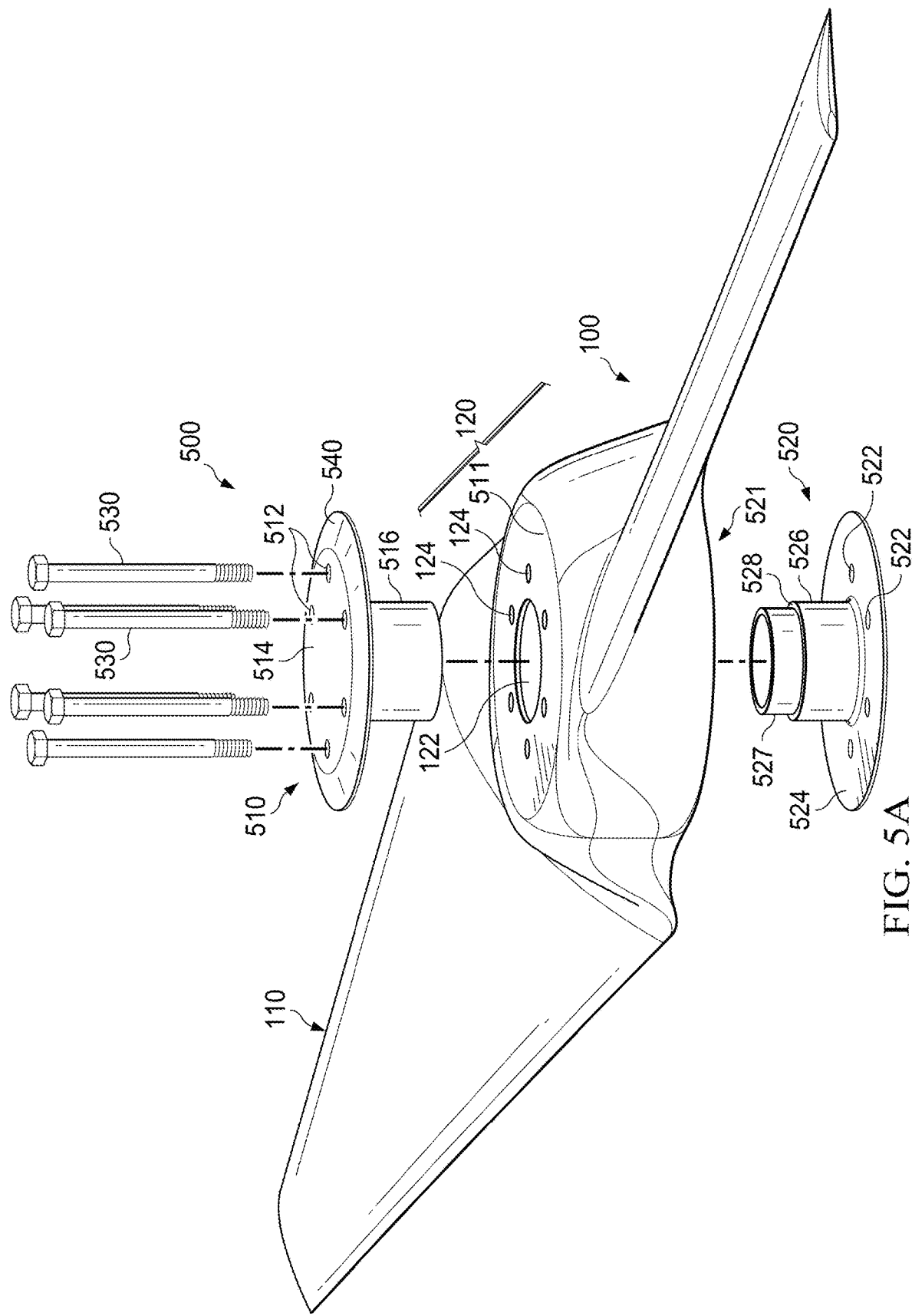
FIGS. 5A and 5B illustrate a hub system of a hollow multi-blade rotor, according to certain embodiments.
Figure 5B:
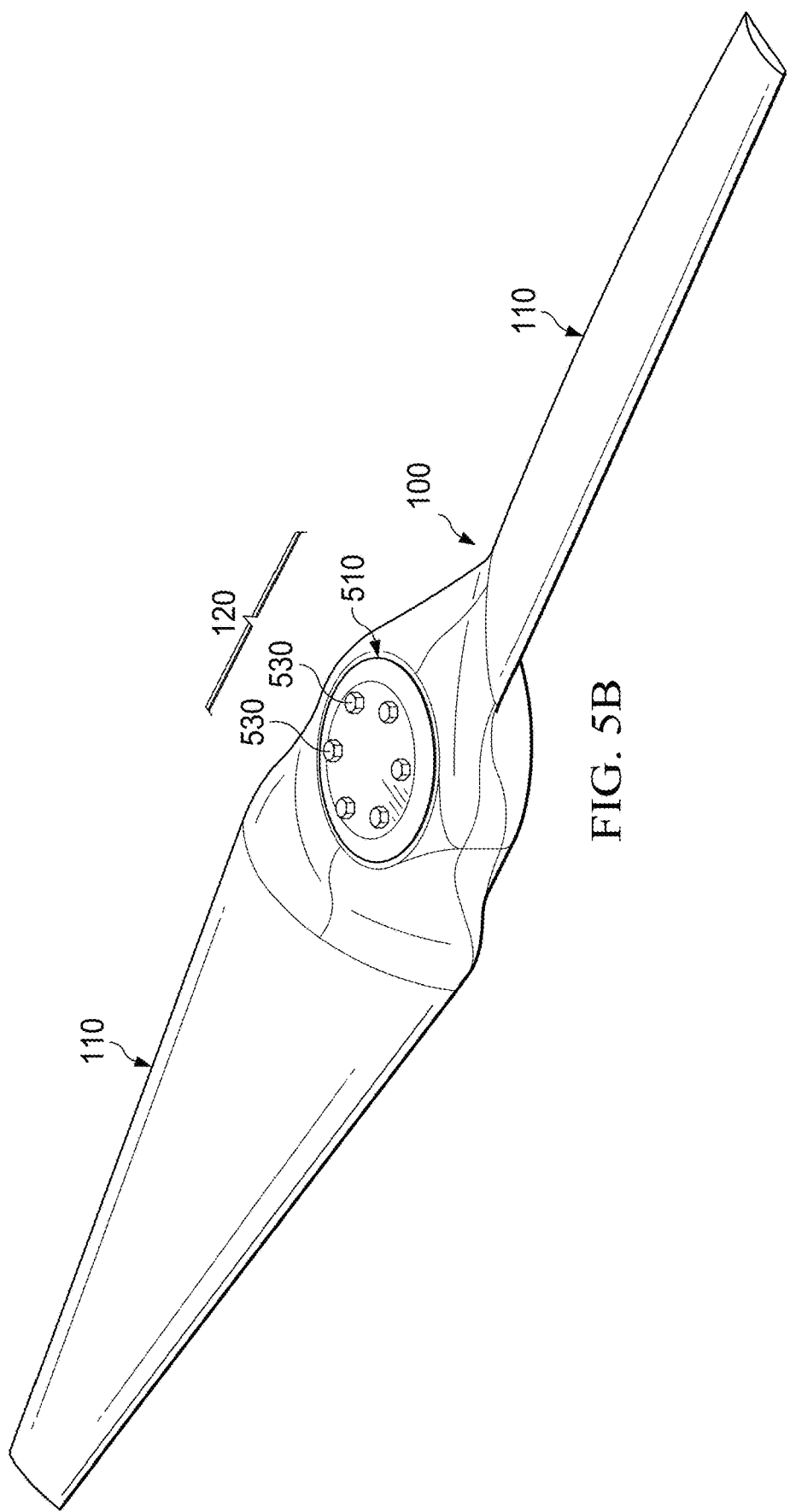
Figure 5C:
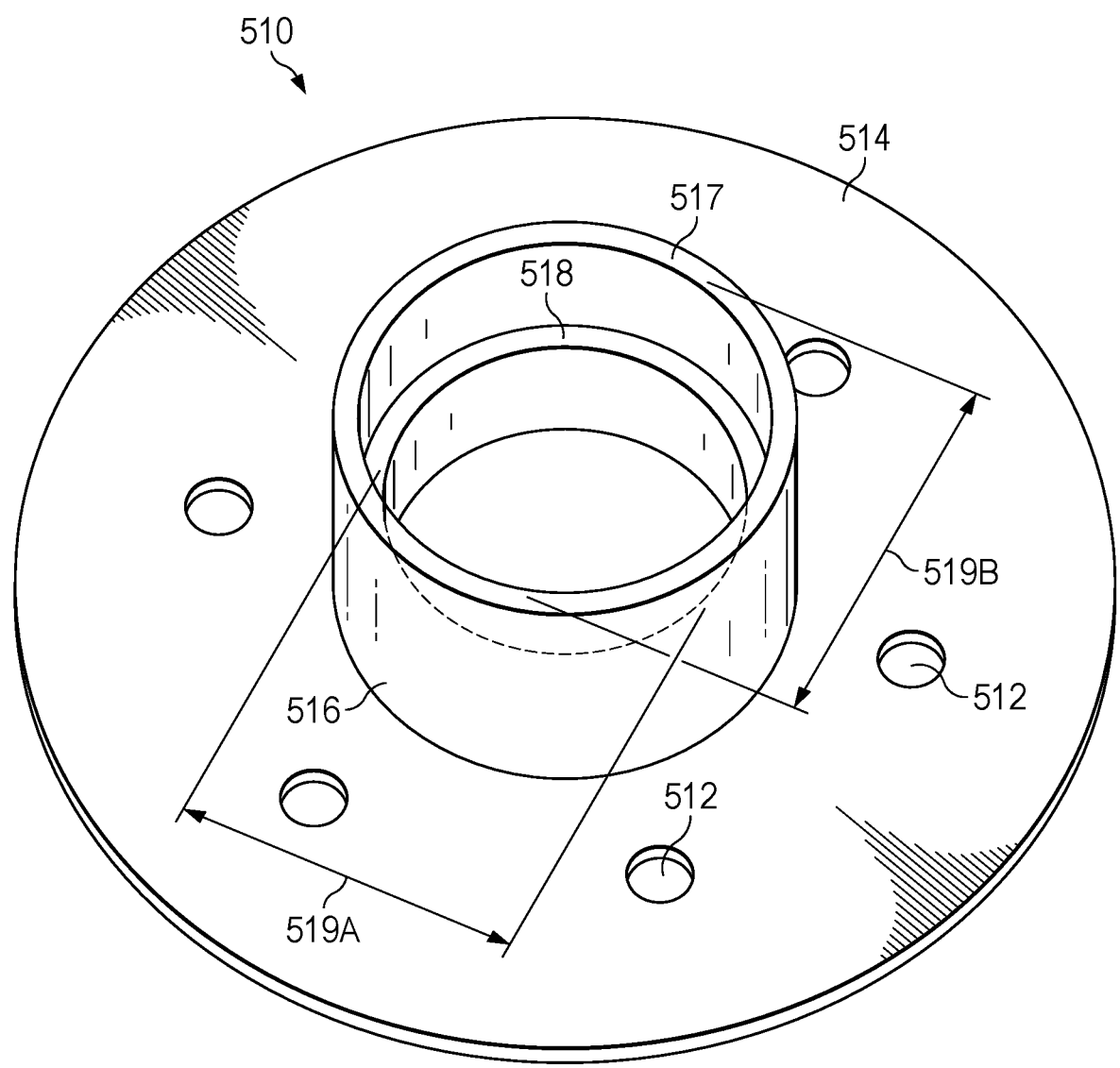
FIGS. 5C and 5D illustrate an upper hub fitting of the hub system of FIGS. 5A-5B, according to certain embodiments.
Figure 5D:
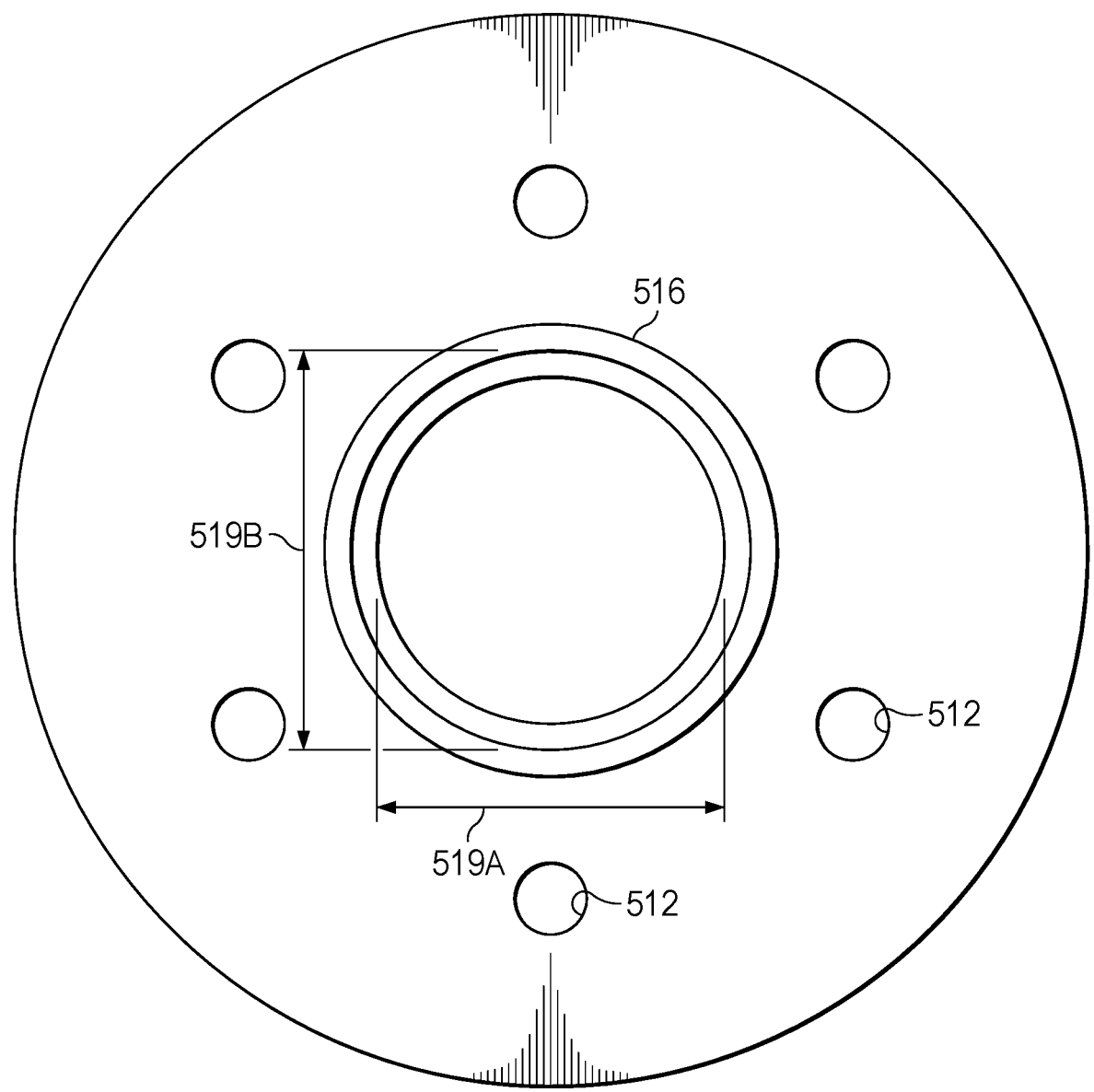
Figure 5E:
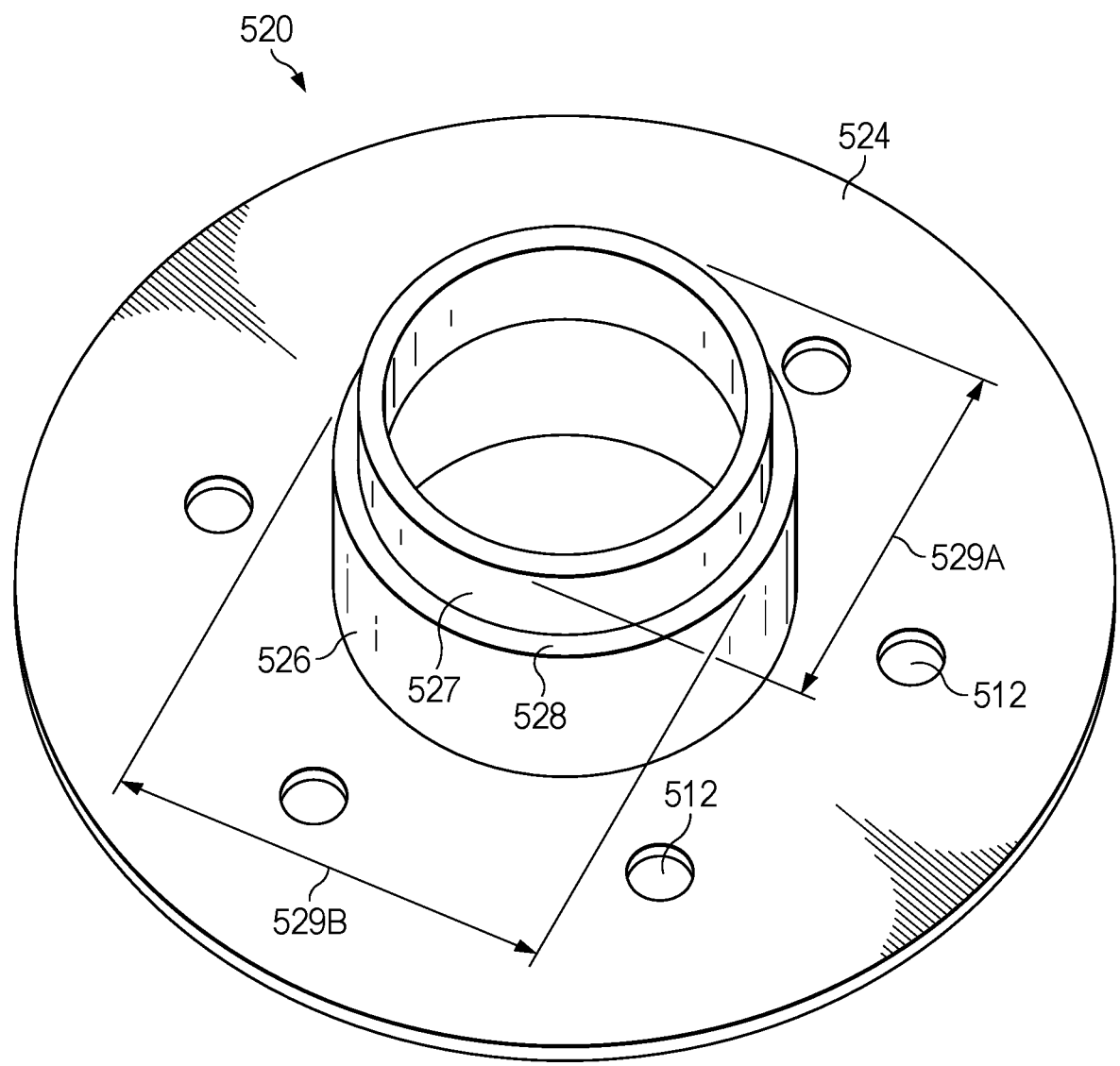
FIGS. 5E and 5F illustrate a lower hub fitting of the hub system of FIGS. 5A-5B, according to certain embodiments.
Figure 5F:
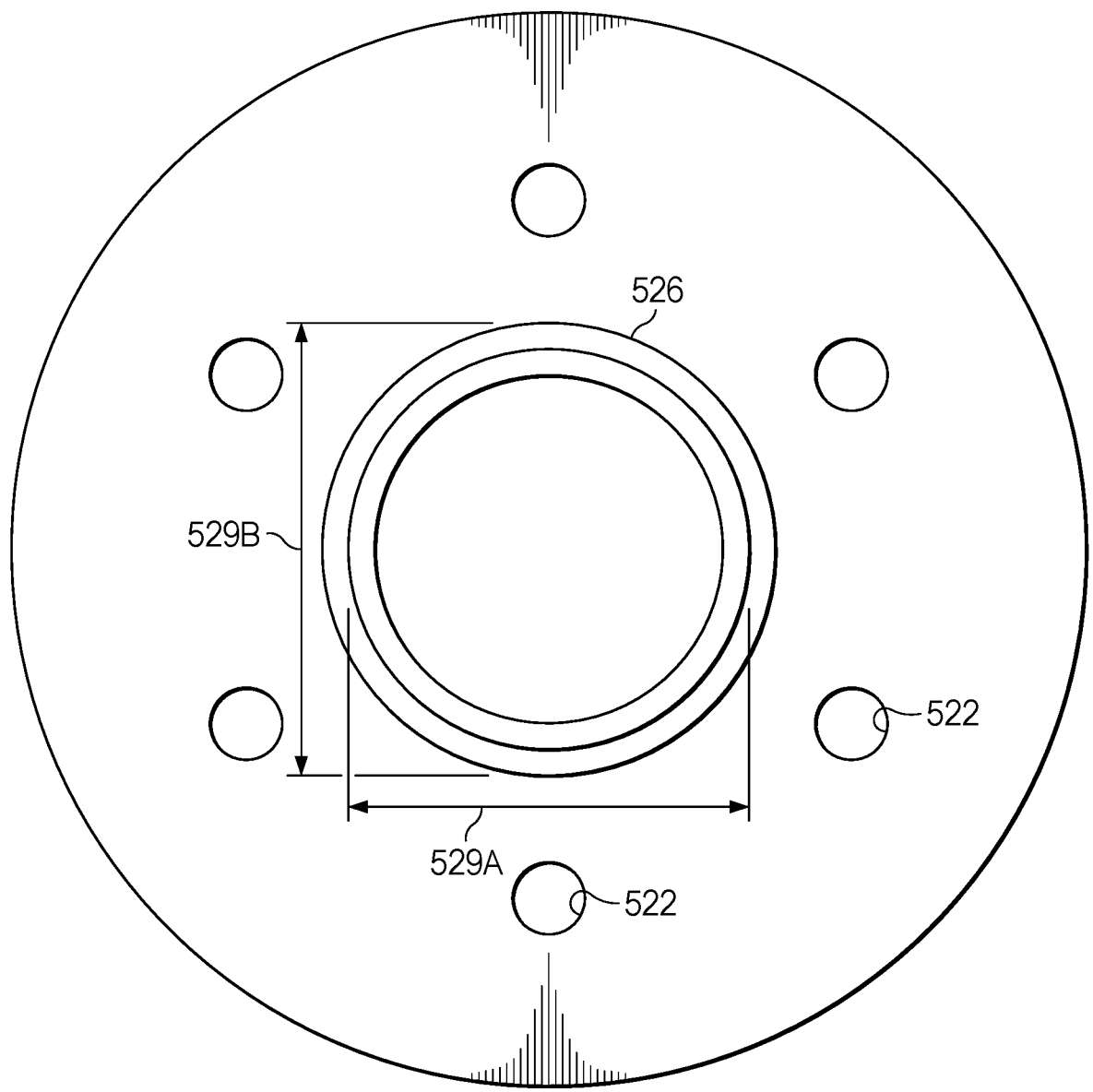
Figure 5G:
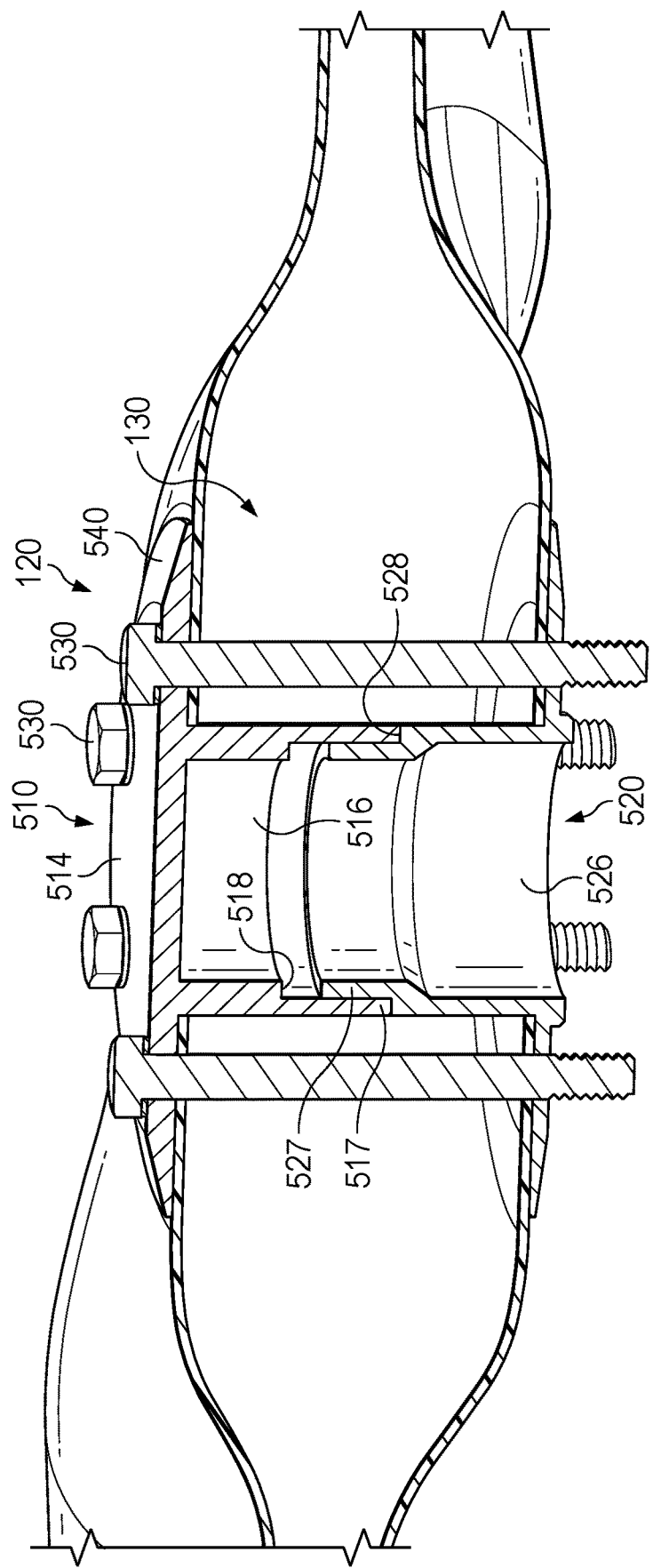
FIG. 5G illustrates a cross sectional view of the of the hub system of FIGS. 5A-5B, according to certain embodiments.

In order to couple hollow multi-blade rotor 100 to a motor, some embodiments utilize a hub system 500 as illustrated in FIGS. 5A-5G. In general, hub system 500 allows hollow multi-blade rotor 100 to be securely coupled to a motor while preventing hollow multi-blade rotor 100 from deforming or collapsing due to hub area 120 being hollow. Hub system 500 can include an upper hub fitting 510, a lower hub fitting 520, and multiple coupling bolts 530. Hub system will be described in reference to FIGS. 5A-5G in which: FIGS. 5A and 5B illustrate hub system 500; FIGS. 5C and 5D illustrate an upper hub fitting 510 of hub system 500; FIGS. 5E and 5F illustrate a lower hub fitting 520 of hub system 500; and FIG. 5G illustrates a cross sectional view of hub system 500, according to certain embodiments.

Upper hub fitting 510 is one component of hub system 500 that attaches to the outside portion 511 of hollow hub area 120 of hollow multi-blade rotor 100 (i.e., the portion of hollow hub area 120 that is on the opposite side of hollow multi-blade rotor 100 from the motor to which hollow multi-blade rotor 100 is to be attached). In some embodiments, upper hub fitting 510 may be made of any appropriate material such as metal (e.g., aluminum, titanium, and the like), plastic, a composite, or any other appropriate material. Upper hub fitting 510 can include multiple upper hub fitting bolt apertures 512, an upper hub flange 514, and an upper hub tubular member 516. Upper hub fitting bolt apertures 512 may be round holes within upper hub flange 514 that accommodate coupling bolts 530. In some embodiments, upper hub fitting 510 includes six upper hub fitting bolt apertures 512 at sixty degrees spacing that align with bolt apertures 124 of hollow hub area 120. Other embodiments may have additional or fewer upper hub fitting bolt apertures 512 with any other appropriate spacing.

Upper hub flange 514 can be generally circular in shape and provide for a stable surface in which to contact hollow hub area 120 and accommodate coupling bolts 530 as coupling bolts 530 couple hollow multi-blade rotor 100 to a motor. As illustrated in FIGS. 5A, 5C, and 5D, upper hub flange 514 is coupled to and is coaxial with upper hub tubular member 516. In some embodiments, upper hub flange 514 has a larger overall diameter than upper hub tubular member 516. In some embodiments, upper hub flange 514 and upper hub tubular member 516 are a single unit (e.g., upper hub flange 514 and upper hub tubular member 516 are formed as a single piece using die casting or similar techniques). In other embodiments, upper hub flange 514 and upper hub tubular member 516 are separate components that are coupled together (e.g., via welding). In some embodiments, upper hub tubular member 516 has a flat outer surface with a sloped edge 540 around the perimeter of upper hub flange 514. Sloped edge 540 may allow for better aerodynamics as hollow multi-blade rotor 100 rotates. In some embodiments, upper hub fitting 510 may include an aperture (not illustrated) in the center of upper hub flange 514 that is coaxial with upper hub flange 514 and upper hub tubular member 516.

Upper hub tubular member 516 is generally tubular in shape as illustrated in FIGS. 5C and 5D. Upper hub tubular member 516 includes an end portion 517 that is on an opposite end of upper hub tubular member 516 from where upper hub tubular member 516 connects to upper hub flange 514. End portion 517 has an inner diameter 519B. Upper hub tubular member 516 also includes a circular ledge 518 that can be a certain distance from end portion 517. The distance of the circular ledge 518 from the end portion 517 can vary based on the application requirements. Circular ledge 518 is internal to upper hub tubular member 516 as illustrated and has an inner diameter 519A that is less than inner diameter 519B of end portion 517.

Lower hub fitting 520 is one component of hub system 500 that attaches to the inside portion 521 of hollow hub area 120 of hollow multi-blade rotor 100 (i.e., the portion of hollow hub area 120 that contacts the motor to which hollow multi-blade rotor 100 is to be attached). In some embodiments, lower hub fitting 520 may be made of any appropriate material such as metal (e.g., aluminum, titanium, and the like), plastic, a composite, or any other appropriate material. Lower hub fitting 520 can include multiple lower hub fitting bolt apertures 522, a lower hub flange 524, and a lower hub tubular member 526. Lower hub fitting bolt apertures 522 may be round holes within lower hub flange 524 that accommodate coupling bolts 530. In some embodiments, lower hub fitting 520 includes six lower hub fitting bolt apertures 522 at sixty degrees spacing that align with bolt apertures 124 of hollow hub area 120. Other embodiments may have additional or fewer lower hub fitting bolt apertures 522 with any other appropriate spacing.

Lower hub flange 524 can be generally circular in shape and provide for a stable surface in which to contact hollow hub area 120 and accommodate coupling bolts 530 as coupling bolts 530 couple hollow multi-blade rotor 100 to a motor. As illustrated in FIGS. 5A, 5E, and 5F, lower hub flange 524 is coupled to and is coaxial with lower hub tubular member 526. In some embodiments, lower hub flange 524 has a larger overall diameter than lower hub tubular member 526. In some embodiments, lower hub flange 524 and lower hub tubular member 526 are a single unit (e.g., lower hub flange 524 and lower hub tubular member 526 are formed as a single piece using die casting or similar techniques like). In other embodiments, lower hub flange 524 and lower hub tubular member 526 are separate components that are coupled together (e.g., via welding). In some embodiments, lower hub tubular member 526 has a flat outer surface with a sloped edge 540 around the perimeter of lower hub flange 524. Sloped edge 540 may allow for better aerodynamics as hollow multi-blade rotor 100 rotates. In some embodiments, lower hub fitting 520 may include an aperture (not illustrated) in the center of lower hub flange 524 that is coaxial with lower hub flange 524 and lower hub tubular member 526.

Lower hub tubular member 526 is generally tubular in shape as illustrated in FIGS. 5E and 5F. Lower hub tubular member 526 includes an end portion 527 that is on an opposite end of lower hub tubular member 526 from where lower hub tubular member 526 connects to lower hub flange 524. End portion 527 has an outer diameter 529B that is configured to fit inside the inner diameter 519B of end portion 517 of upper hub tubular member 516. Lower hub tubular member 526 also includes a circular ledge 528 that is a certain distance from end portion 527. The distance of the circular ledge 528 from the end portion 527 can vary based on the application requirements. Circular ledge 528 is external to lower hub tubular member 526 as illustrated and has an outer diameter 529A that is less than outer diameter 529B of end portion 527.

Coupling bolts 530 are any appropriate bolts of any appropriate size for coupling hollow multi-blade rotor 100 to a motor. In some embodiments, hollow multi-blade rotor 100 utilizes six coupling bolts 530 as illustrated. Other embodiments may include fewer or more coupling bolts 530. In general, each coupling bolt 530 passes through upper hub fitting 510, hollow hub area 120, and lower hub fitting 520 before coupling to threads of a motor (not illustrated).

In operation, hub system 500 prevents deformation or collapse of hollow hub area 120 when coupling bolts 530 are used to couple hollow multi-blade rotor 100 to a motor. To do so, upper hub tubular member 516 of upper hub fitting 510 is placed into main hub aperture 122 of hollow hub area 120 so that an underside of upper hub flange 514 contacts outside portion 511 of hollow hub area 120. Next, lower hub tubular member 526 of lower hub fitting 520 is placed into main hub aperture 122 of hollow hub area 120 so that an underside of lower hub flange 524 contacts inside portion 521 of hollow hub area 120. As illustrated in FIG. 5G, when both upper hub fitting 510 and lower hub fitting 520 are fully inserted into main hub aperture 122, ledge 528 of lower hub fitting 520 contacts end portion 517 of upper hub tubular member 516 as coupling bolts 530 are tightened. Because upper hub fitting 510 and lower hub fitting 520 are rigid and are in contact with each other, hollow hub area 120 is prevented from being deformed when coupling bolts 530 are used to couple hollow multi-blade rotor 100 to a motor.

While FIG. 5G illustrates ledge 528 of lower hub fitting 520 contacting end portion 517 of upper hub tubular member 516 as coupling bolts 530 are tightened, other embodiments may have alternate dimensions so that ledge 518 of upper hub fitting 510 additionally or alternatively contacts end portion 527 of lower hub fitting 520 as coupling bolts 530 are tightened. In still other embodiments, ledges 518 and 528 may be eliminated altogether (i.e., upper hub tubular member 516 and lower hub tubular member 526 may have constant diameters along their entire lengths). In these embodiments, the ends of upper hub tubular member 516 and lower hub tubular member 526 may simply contact each other in order to prevent deformation or collapse of hollow hub area 120 when coupling bolts 530 are used to coupled hollow multi-blade rotor 100 to a motor.

Figure 6A:
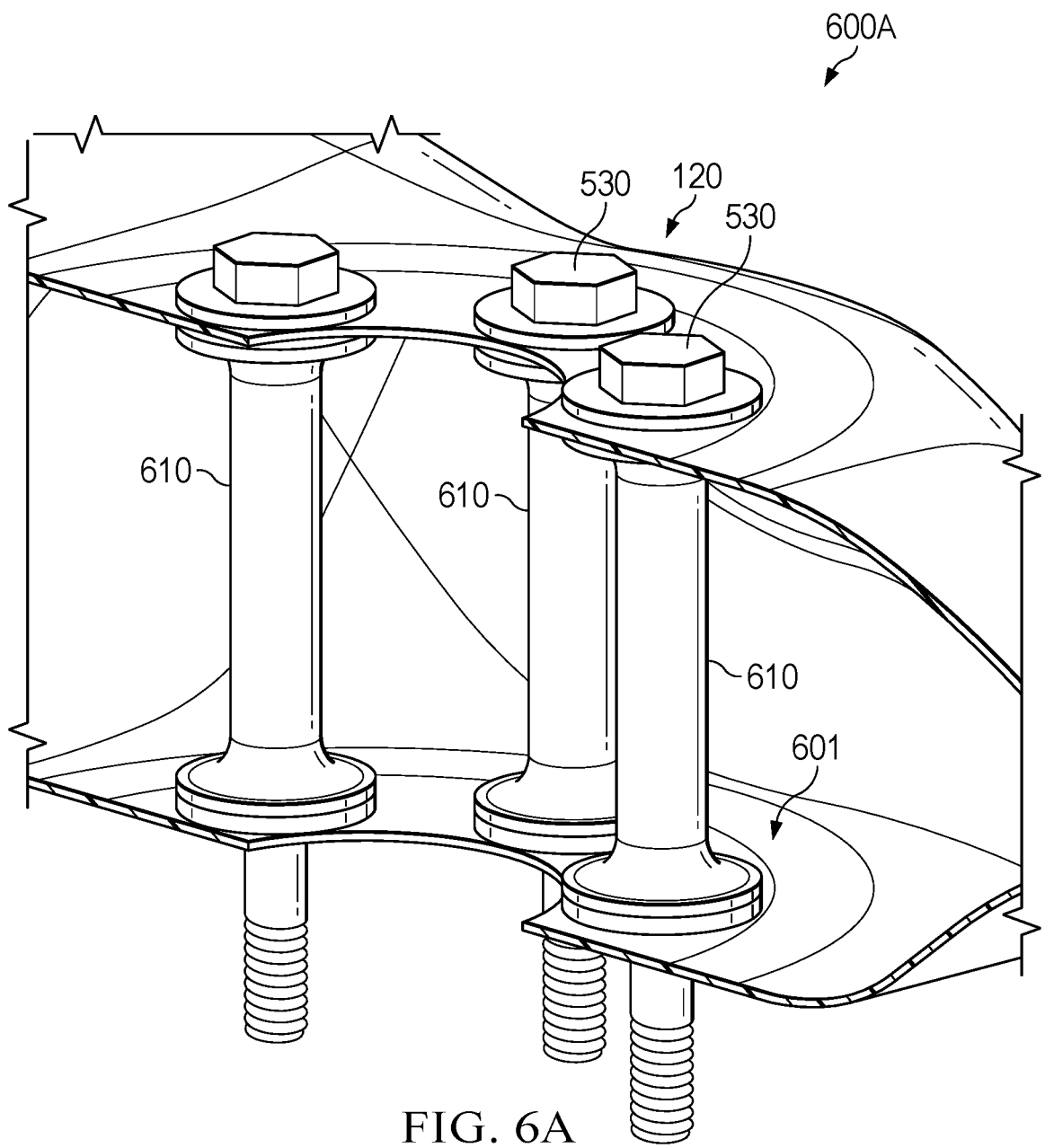
FIGS. 6A-6D illustrate alternate systems for coupling a hollow multi-blade rotor to a motor, according to certain embodiments.

FIGS. 6A-6D illustrate alternate systems 600A-600D for coupling a hollow multi-blade rotor to a motor, according to certain embodiments. FIG. 6A illustrates a system 600A that includes internal members 610 for coupling hollow multi-blade rotor 100 to a motor. In this embodiment, an internal member 610 is provided for each coupling bolt 530. Each internal member 610 is hollow to allow a respective coupling bolt 530 to pass through. Each internal member may also include a flange or flair at each end as illustrated. Each end of each internal member 610 contacts an inside surface 601 of hollow hub area 120. Internal members 610 are made of a rigid material (e.g., metal) and are therefore able to absorb the loads generated by the tightening of coupling bolts 530, thereby preventing deformation or collapse of hollow hub area 120 when coupling bolts 530 are used to coupled hollow multi-blade rotor 100 to a motor.

Figure 6B:
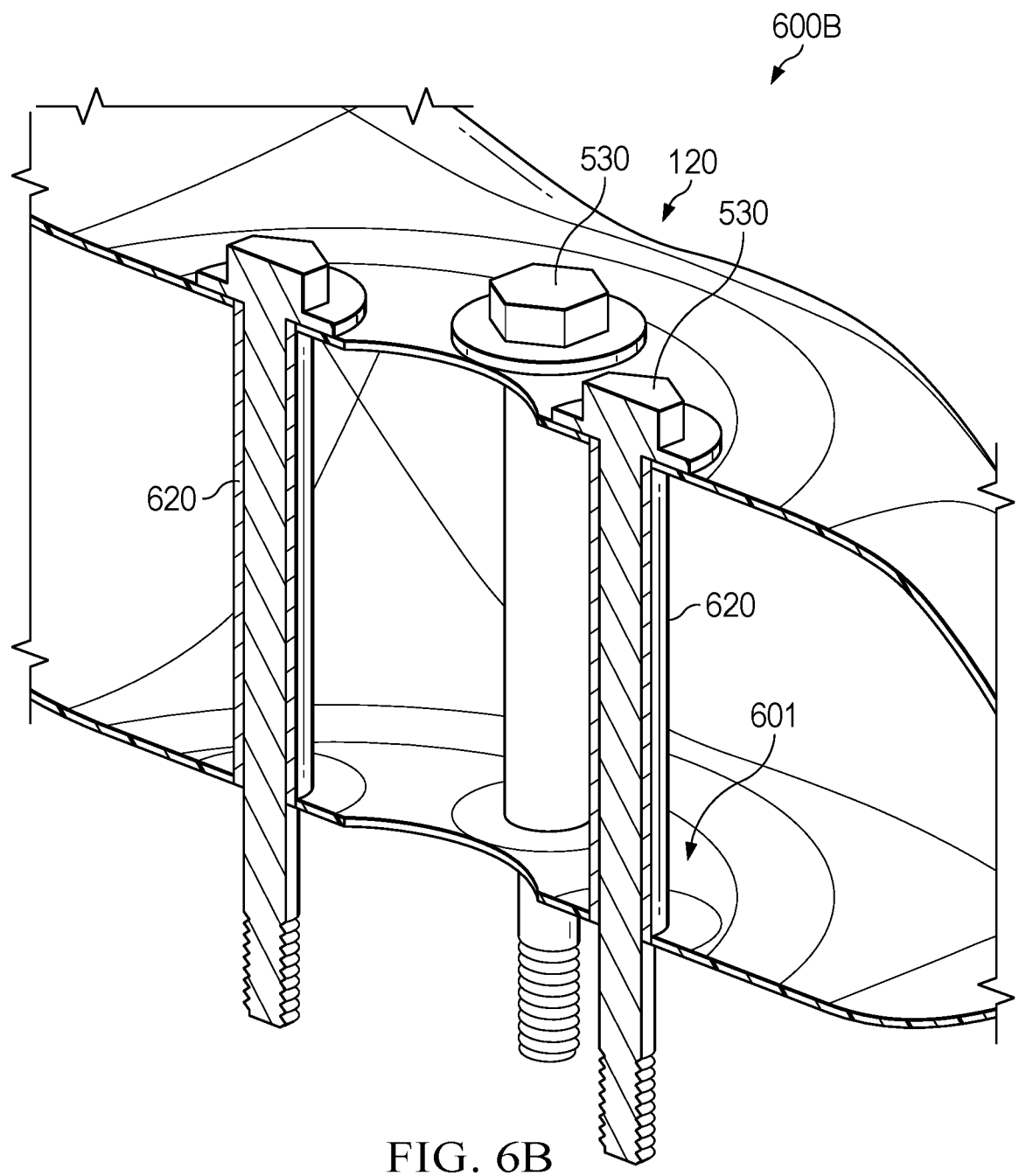

FIG. 6B illustrates a system 600B that includes internal members 620 for coupling hollow multi-blade rotor 100 to a motor. In this embodiment, an internal member 620 is provided for each coupling bolt 530. Each internal member 620 is hollow to allow a respective coupling bolt 530 to pass through. Unlike system 600A of the previous figure, each end of each internal member 610 passes through a respective bolt aperture 124 and contacts an underside of a respective coupling bolt 530. Internal members 620 are made of a rigid material (e.g., metal) and are therefore able to absorb the loads generated by the tightening of coupling bolts 530, thereby preventing deformation or collapse of hollow hub area 120 when coupling bolts 530 are used to coupled hollow multi-blade rotor 100 to a motor.

Figure 6C:
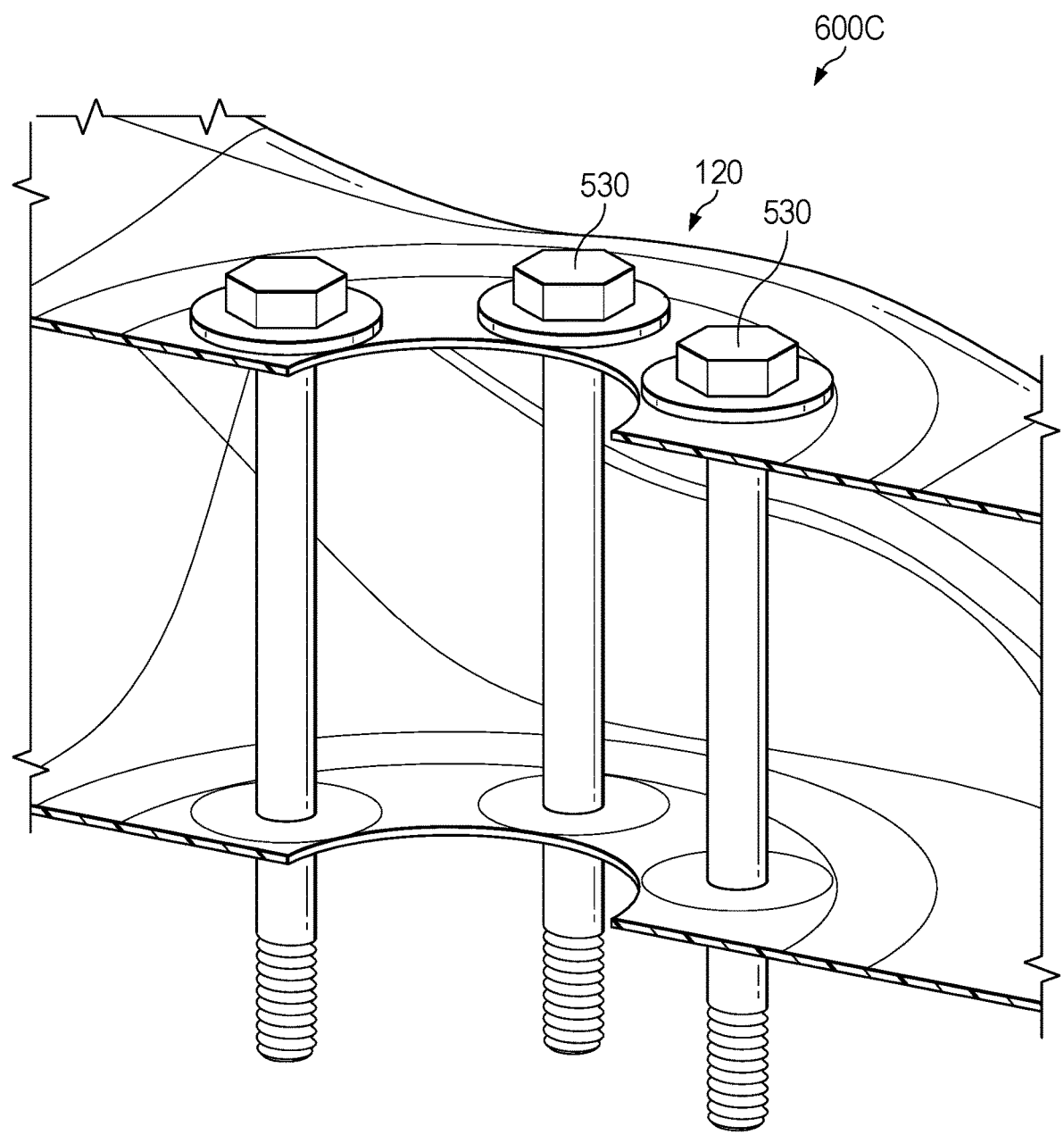

FIG. 6C illustrates a system 600C that eliminates any internal members or sleeves for coupling hollow multi-blade rotor 100 to a motor. In this embodiment, coupling bolts 530 are simply passed through bolt apertures 124 of both sides of hollow hub area 120 and into threads of a motor. To prevent deformation of hollow hub area 120, coupling bolts 530 are monitored and only tightened to a predetermined torque in order to prevent deformation or collapse of hollow hub area 120 when coupling bolts 530 are used to coupled hollow multi-blade rotor 100 to a motor.

Figure 6D:
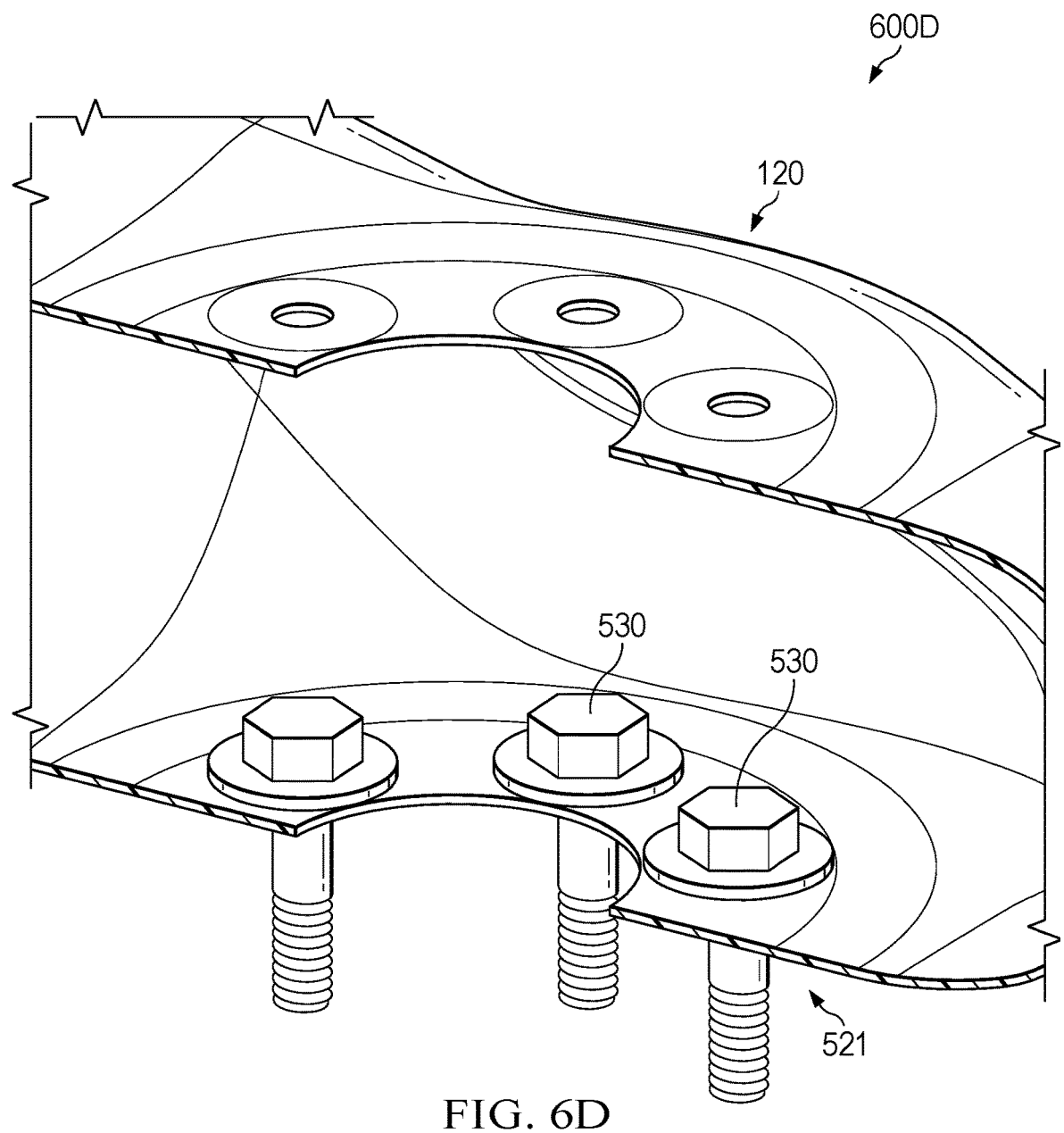

FIG. 6D illustrates a system 600D that eliminates any internal members or sleeves for coupling hollow multi-blade rotor 100 to a motor. Unlike the previous figure, however, coupling bolts 530 are only passed through bolt apertures 124 of inside portion 521 of hollow hub area 120 and into threads of a motor. This prevents deformation of hollow hub area 120 since coupling bolts 530 only pass through one surface of hollow hub area 120.

Figure 7:
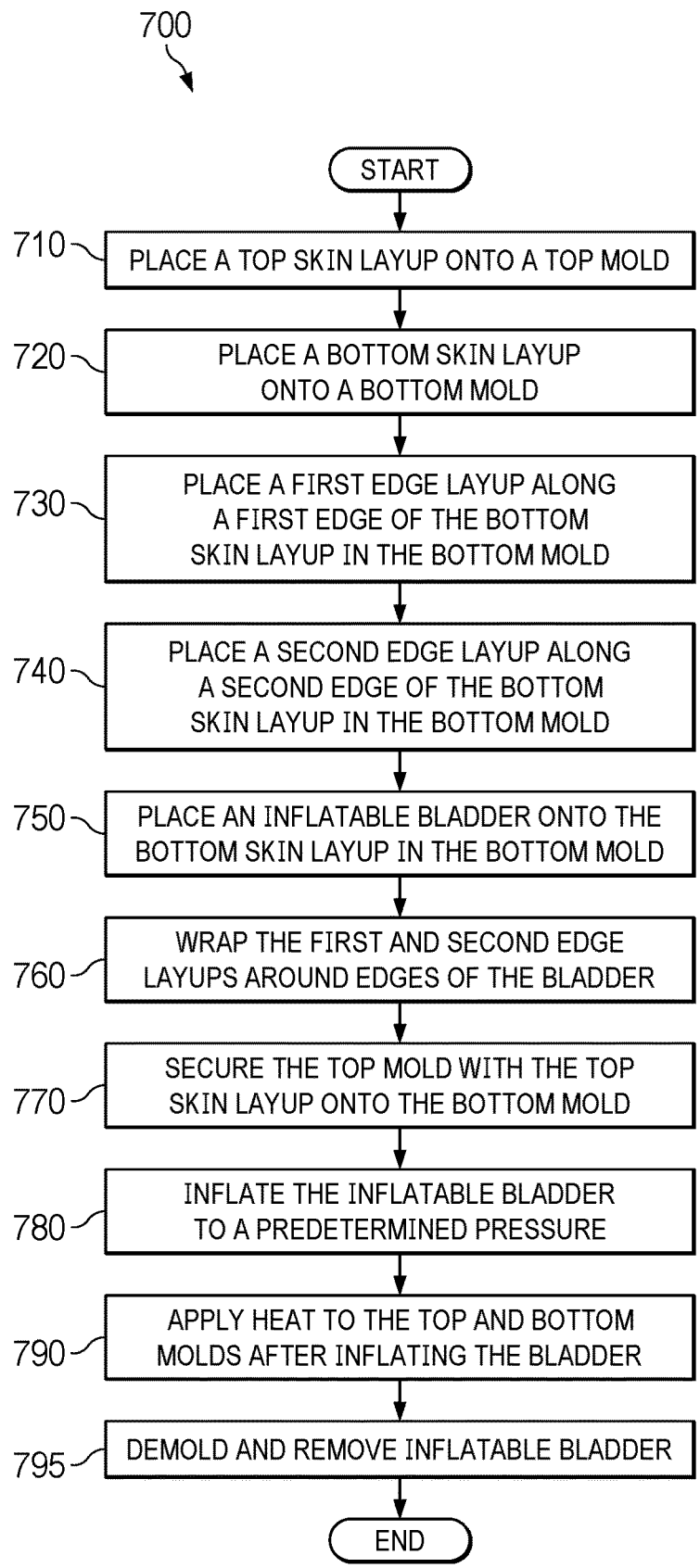
FIG. 7 is a flow diagram of a method of manufacturing a hollow multi-blade rotor, according to certain embodiments.

FIG. 7 is a flow diagram of a method 700 of manufacturing a hollow multi-blade rotor, according to certain embodiments. In some embodiments, method 700 may be used to manufacture hollow multi-blade rotor 100. In addition to FIG. 7, method 700 will be described below in reference to FIGS. 8-11.

Figure 8:
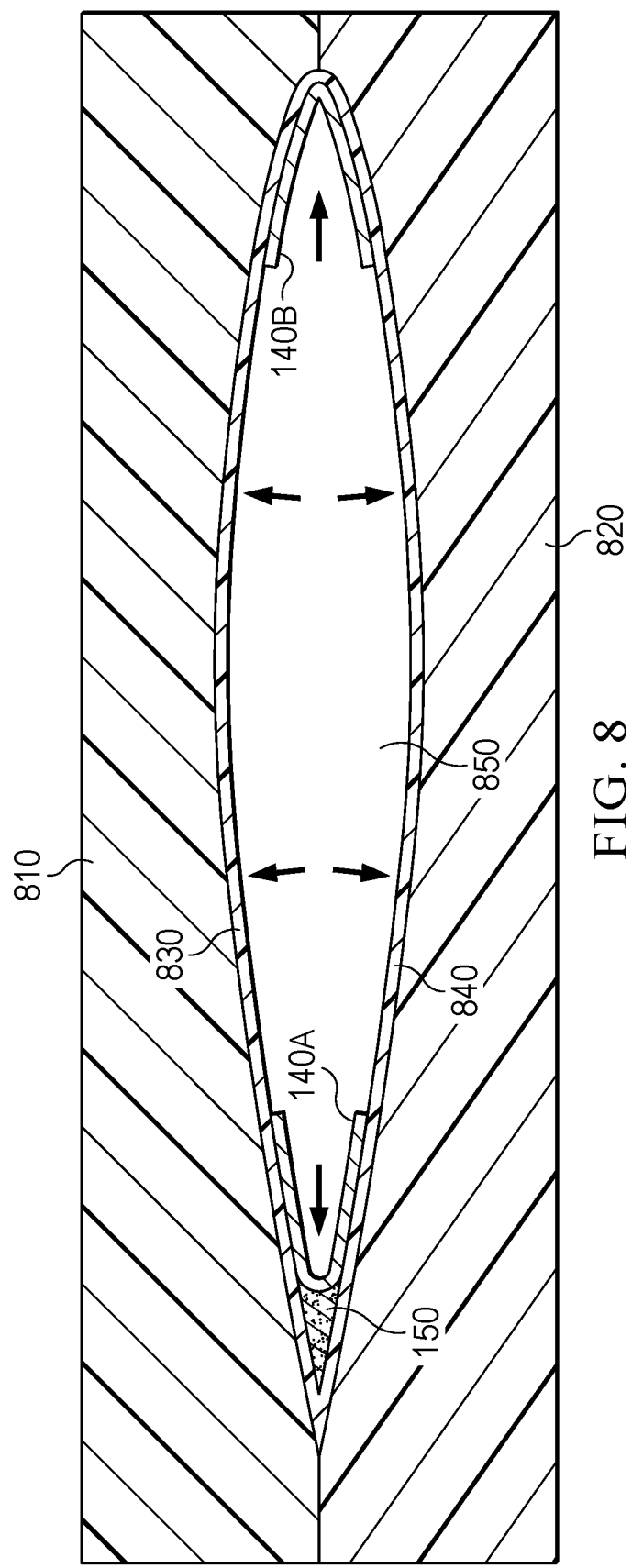
FIG. 8 illustrates a cross sectional view of a hollow multi-blade rotor that may be formed by the method of FIG. 7, according to certain embodiments.
Figure 9:
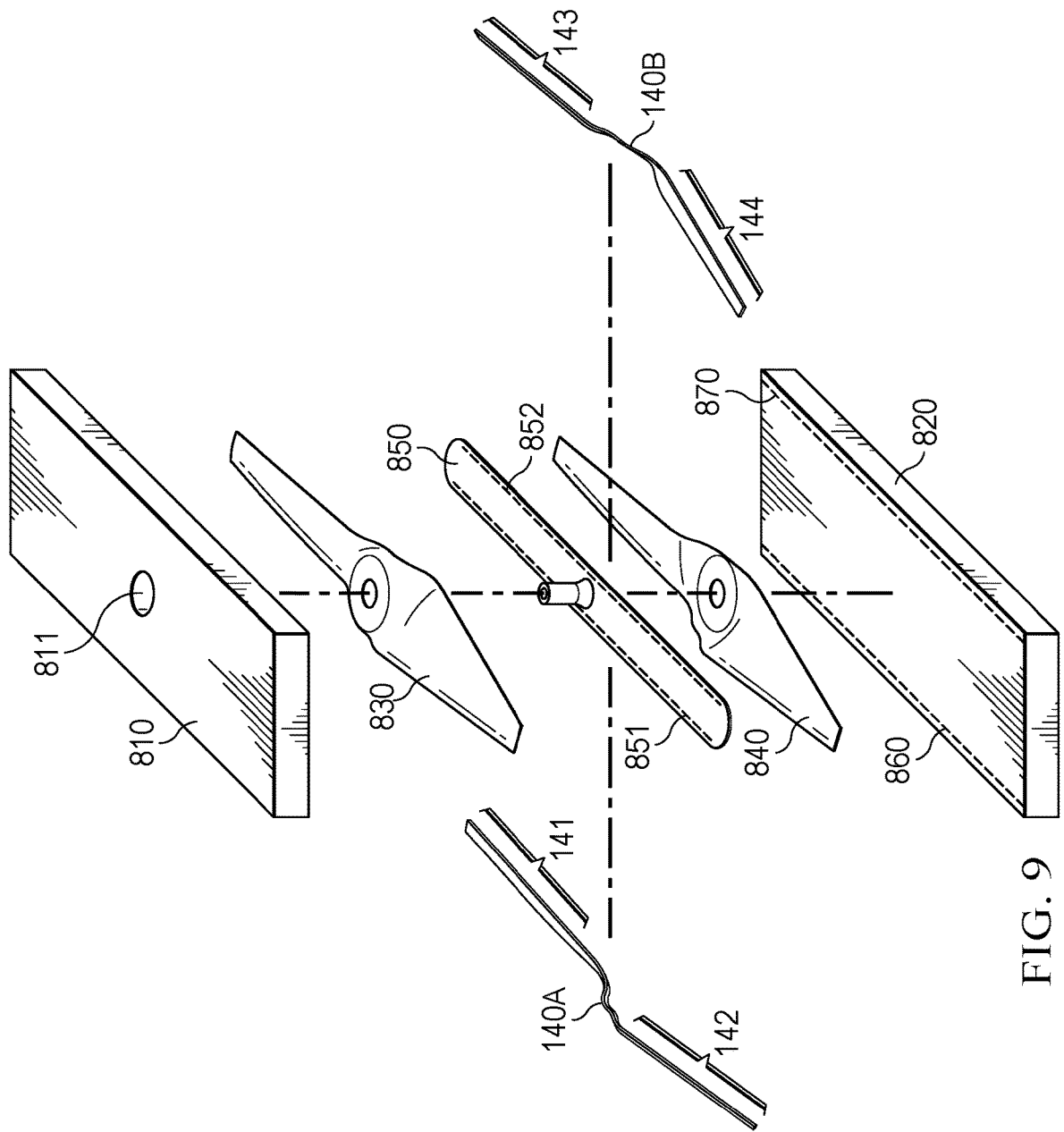
FIGS. 9 and 10 illustrate how a hollow multi-blade rotor may be formed by the method of FIG. 7, according to certain embodiments.

In general, and in reference to FIGS. 8 and 9, method 700 utilizes molds (e.g., a top mold 810 and a bottom mold 820) along with an inflatable bladder (e.g., inflatable bladder 850) to manufacture a hollow multi-blade rotor such as hollow multi-blade rotor 100. Skin layups are first placed into the molds (e.g., a top skin layup 830 is placed into top mold 810 and a bottom skin layup 840 is placed into bottom mold 820). Edge layups such as edge layups 140A and 140B may then be placed on bottom skin layup 840 in bottom mold 820. Inflatable bladder 850 is then placed between the skin layups and the molds are then fastened together. Inflatable bladder 850 is then inflated and the entire system is heated (e.g., in an oven or autoclave) in order to cure the skin layups. Once cured, inflatable bladder 850 and the molds are removed, thereby leaving a hollow multi-blade rotor.

In some embodiments, inflatable bladder 850 can be wrapped on a solid foam or soluble mandrel that can be removed together with the bladder after cure. Ply can be added on inflatable bladder 850 in some embodiment (i.e., not only on the tool).

Returning to FIG. 7, in step 710, a top skin layup is placed onto a top mold. In some embodiments, the top skin layup is top skin layup 830 and the top mold is top mold 810. The top skin layup may be formed from carbon fiber or a carbon fiber composite and may be in a shape of a top side of the hollow multi-blade rotor. For example, the top skin layup may be in a shape of the top of two hollow blades 110 (e.g., 110A and 110B) with a hollow hub area 120 between the two hollow blades 110 as illustrated in FIGS. 1A-1B.

In step 720, a bottom skin layup is placed onto a bottom mold. In some embodiments, the bottom skin layup is bottom skin layup 840 and the bottom mold is bottom mold 820. The bottom skin layup may be formed from carbon fiber or a carbon fiber composite and may be in a shape of a bottom side of the hollow multi-blade rotor. For example, the bottom skin layup may be in a shape of the bottom of two hollow blades 110 (e.g., 110A and 110B) with a hollow hub area 120 between the two hollow blades 110 as illustrated in FIGS. 1A-1B.

In step 730, a first edge layup is placed along a first edge of the bottom skin layup in the bottom mold. For example, as illustrated in FIG. 9, edge layup 140A may be placed along first edge 860 of bottom mold 820. First edge 860 may correspond to edges of hollow blades 110. For example, first edge 860 may correspond to a leading edge 410 of a first hollow blade 110 and a trailing edge 420 of a second hollow blade 110. In some embodiments, first edge layup 140A may be a continuous narrow strip (i.e., a single piece) of carbon fiber or carbon fiber composite material that includes a first end portion 141 that corresponds to a leading edge 410 of a first hollow blade 110 and a second end portion 142 that corresponds to a trailing edge 420 of a second hollow blade 110.

In step 740, a second edge layup is placed along a second edge of the bottom skin layup in the bottom mold. For example, as illustrated in FIG. 9, edge layup 140B may be placed along second edge 870 of bottom mold 820. Second edge 870 may correspond to edges of hollow blades 110. For example, second edge 870 may correspond to a trailing edge 420 of a first hollow blade 110 and a leading edge 410 of a second hollow blade 110. In some embodiments, second edge layup 140B may be a continuous narrow strip (i.e., a single piece) of carbon fiber or carbon fiber composite material that includes a first end portion 143 that corresponds to a trailing edge 420 of a first hollow blade 110 and a second end portion 144 that corresponds to a leading edge 410 of a second hollow blade 110.

In step 750, an inflatable bladder 850 is placed onto the bottom skin layup 840 in bottom mold 820. In some embodiments, inflatable bladder 850 is constructed as explained in more detail below in reference to FIG. 12. In other embodiments, inflatable bladder 850 can be manufactured using other techniques (e.g., a reusable latex or silicone bladder.) After inflatable bladder 850 is placed onto the bottom skin layup 840 in the bottom mold 820 in step 750, step 760 may be performed. In step 760, edge layups 140A and 140B are wrapped around edges of inflatable bladder 850. For example, first edge layup 140A may be wrapped around a first edge 851 of inflatable bladder 850 and second edge layup 140B may be wrapped around a second edge 852 of inflatable bladder 850. FIG. 8 illustrates how each edge layup 140 has been wrapped around a respective edge of inflatable bladder 850.

Figure 10:
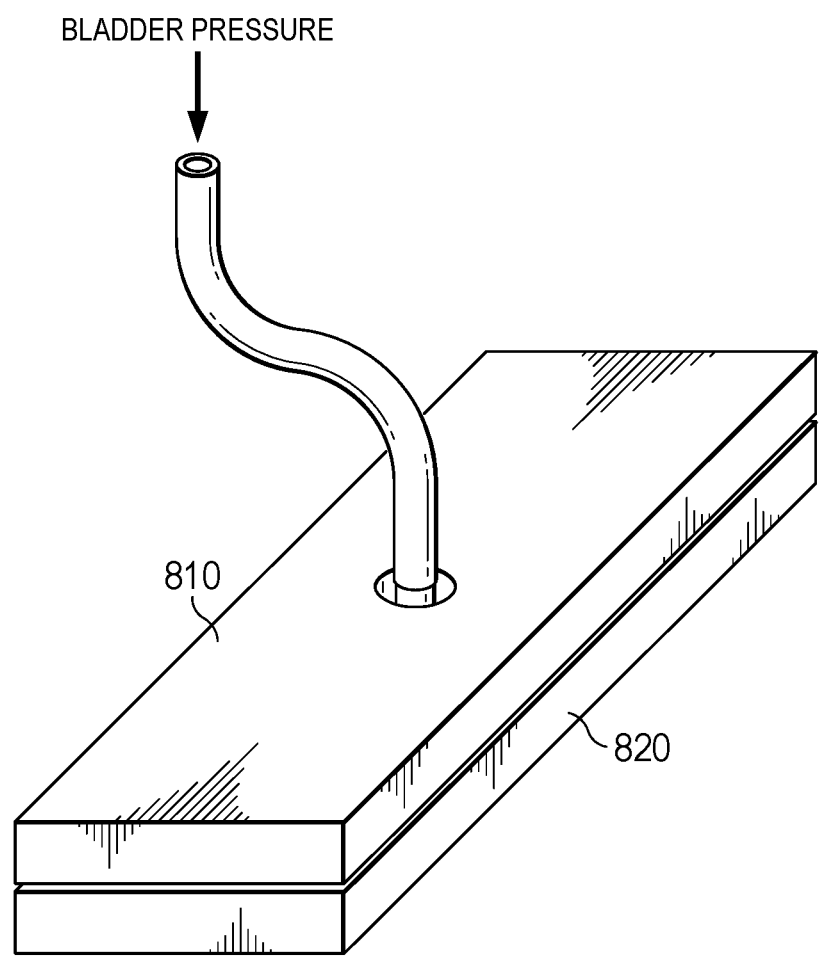

In step 770, top mold 810 that includes top skin layup 830 is secured onto bottom mold 820 as illustrated in FIG. 10. In some embodiments, top mold 810 and bottom mold 820 are secured together with bolts as illustrated in FIG. 13C. In other embodiments, top mold 810 and bottom mold 820 are secured together using any other appropriate mechanism.

In step 780, inflatable bladder 850 is inflated to a predetermined pressure after top mold 810 is secured to bottom mold 820 as illustrated in FIG. 10. In some embodiments, the predetermined pressure is between 50-55 psi. In some embodiments, inflatable bladder 850 is inflated using compressed air, nitrogen, or any other appropriate gas. In some embodiments, inflatable bladder 850 is inflated using a pressure port 1230 that is affixed to inflatable bladder 850 and protrudes through a central aperture 811 of top mold 810.

In step 790, heat is applied to the coupled top and bottom molds 810 and 820 after inflatable bladder 850 has been inflated. In some embodiments, step 790 includes placing the coupled top and bottom molds 810 and 820 into an oven or an autoclave. In some embodiments, step 790 includes utilizing one or more electric heating elements that are coupled to or embedded within one or both of top mold 810 and bottom mold 820. Step 790 cures top skin layup 830 and bottom skin layup 840, thereby forming a hollow multi-blade rotor. After step 790, method 700 may end.

In some embodiments, method 700 may additionally include deflating inflatable bladder 850 after step 790. In some embodiments, this may include using the pressure port that is affixed to inflatable bladder 850 and protrudes through a central aperture 811 of top mold 810. After inflatable bladder 850 has be deflated, method 700 may also include removing the deflated inflatable bladder 850 in step 795 through main hub aperture 122 (i.e., after one or both of the top and bottom molds are removed). In alternate embodiments, central aperture 811 may be included in bottom mold 820 instead of top mold 810.

Figure 11:
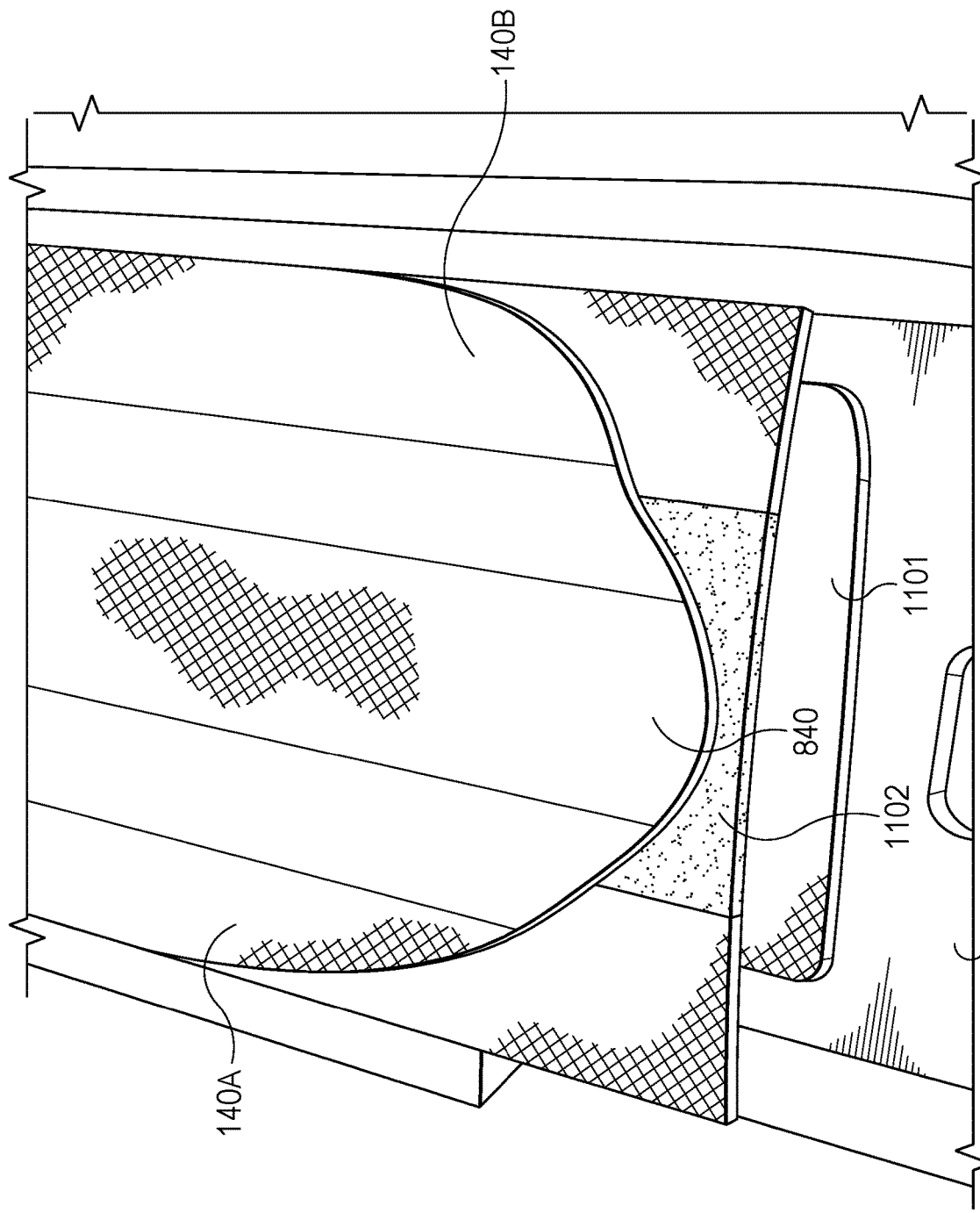
FIG. 11 illustrates additional component that may be used by the method of FIG. 7 to form a hollow multi-blade rotor, according to certain embodiments.

In some embodiments, method 700 may include adding additional components to strengthen the edges and tips of hollow multi-blade rotor 100. For example, FIG. 11 illustrates that addition of a tip preform 1101 and an epoxy adhesive filler 1102. Tip preform 1101 (also known in the industry as a "noodle") may be formed from unidirectional fiber-reinforced tape using molds. In these embodiments, tip preform 1101 may be applied directly on top of bottom skin layup 840. Edge layups 140 may then be applied on top of tip preform 1101. Finally, epoxy adhesive filler 1102 may be applied on top of edge layups 140.

In some embodiments, an additional edge preform ("noodle") may be used as edge filler 150 as illustrated in FIG. 4. The edge preform may be formed from unidirectional fiber-reinforced tape using molds. In these embodiments, the edge preform may be applied directly on top of bottom skin layup 840. An edge layup 140 may then be applied on top of the edge preform. The edge preform (i.e., edge filler 150) fills the gap between the trailing edge of hollow blade 110 and edge layup 140.

Figure 12:
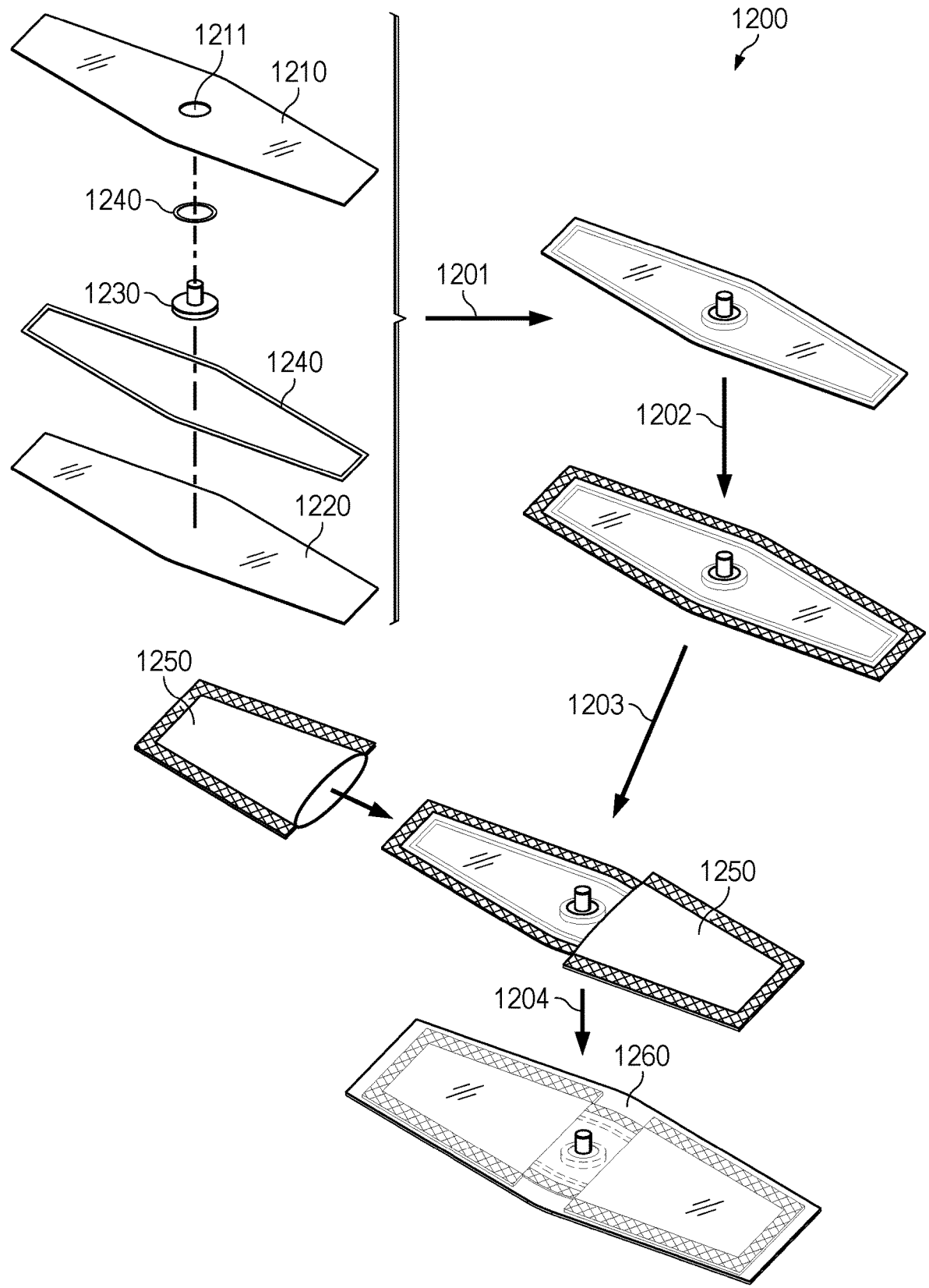
FIG. 12 illustrates a process of assembling an inflatable bladder that may be used to form a hollow multi-blade rotor, according to certain embodiments.

FIG. 12 illustrates an assembly process 1200 for creating inflatable bladder 850, according to certain embodiments. At step 1201, a pressure port 1230 is coupled to an underside of an upper vacuum bag sheet 1210 through a central aperture 1211 using vacuum bag sealant tape 1240. Pressure port 1230 may be, for example, a male quick-release air compressor coupling. Next, vacuum bag sheets (e.g., an upper vacuum bag sheet 1210 and a lower vacuum bag sheet 1220) are coupled together using vacuum bag sealant tape 1240. For example, vacuum bag sealant tape 1240 may be used to couple upper vacuum bag sheet 1210 and lower vacuum bag sheet 1220 together around their outer perimeters. In general, upper vacuum bag sheet 1210 and lower vacuum bag sheet 1220 are each in a shape of a hollow multi-blade rotor such as hollow multi-blade rotor 100. For example, upper vacuum bag sheet 1210 may be in a shape of the top of two hollow blades 110 (e.g., 110A and 110B) with a hollow hub area 120 between the two hollow blades 110 as illustrated in FIGS. 1A-1B. Similarly, lower vacuum bag sheet 1220 may be in a shape of the bottom of two hollow blades 110 (e.g., 110A and 110B) with a hollow hub area 120 between the two hollow blades 110 as illustrated in FIGS. 1A-1B.

At step 1202, the edges of upper vacuum bag sheet 1210 and lower vacuum bag sheet 1220 are sealed together to form an air-tight bond. In some embodiments, the edges of upper vacuum bag sheet 1210 and lower vacuum bag sheet 1220 are sealed together using a plastic heat-sealing machine.

At step 1203, sleeves 1250 are inserted over the sealed upper vacuum bag sheet 1210 and lower vacuum bag sheet 1220. Sleeves 1250 can be formed using the same process and materials as steps 1201 and 1202 except: vacuum bag sealant tape 1240 and pressure port 1230 may be omitted; and vacuum bag sheets 1210 and 1220 may be cut approximately in half to form two sleeves 1250. After step 1203, the sealed vacuum bag sheets 1210 and 1220 and sleeves 1250 may be wrapped completely in release film 1260. Once wrapped in release film 1260, the assembly may be utilized as inflatable bladder 850.

Figure 13A:
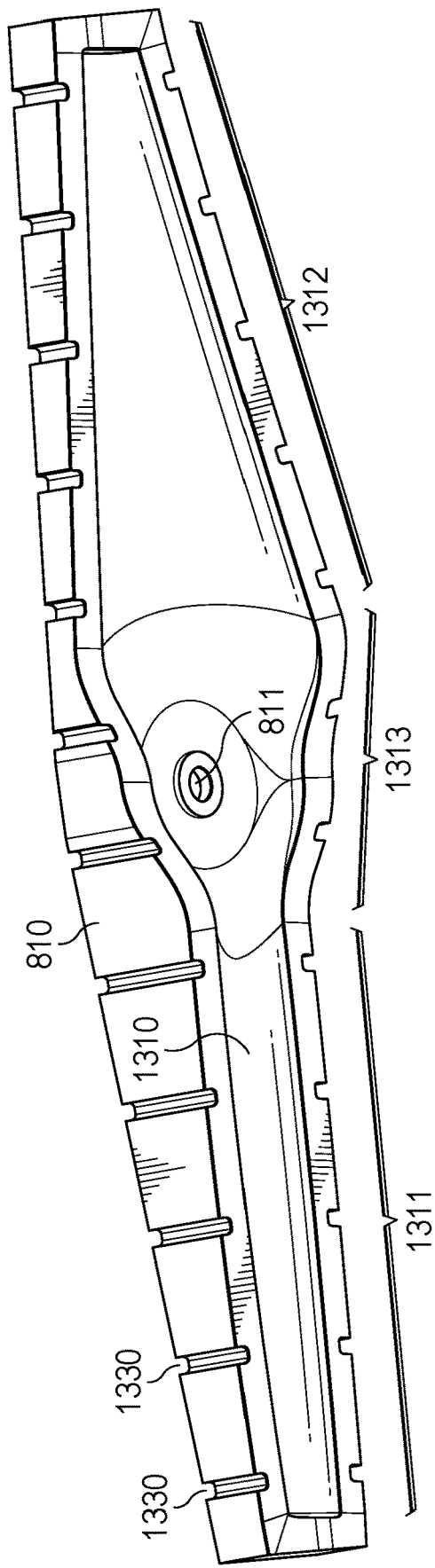
FIGS. 13A-13C illustrate a system that may be used to manufacture a hollow multi-blade rotor, according to certain embodiments.
Figure 13B:
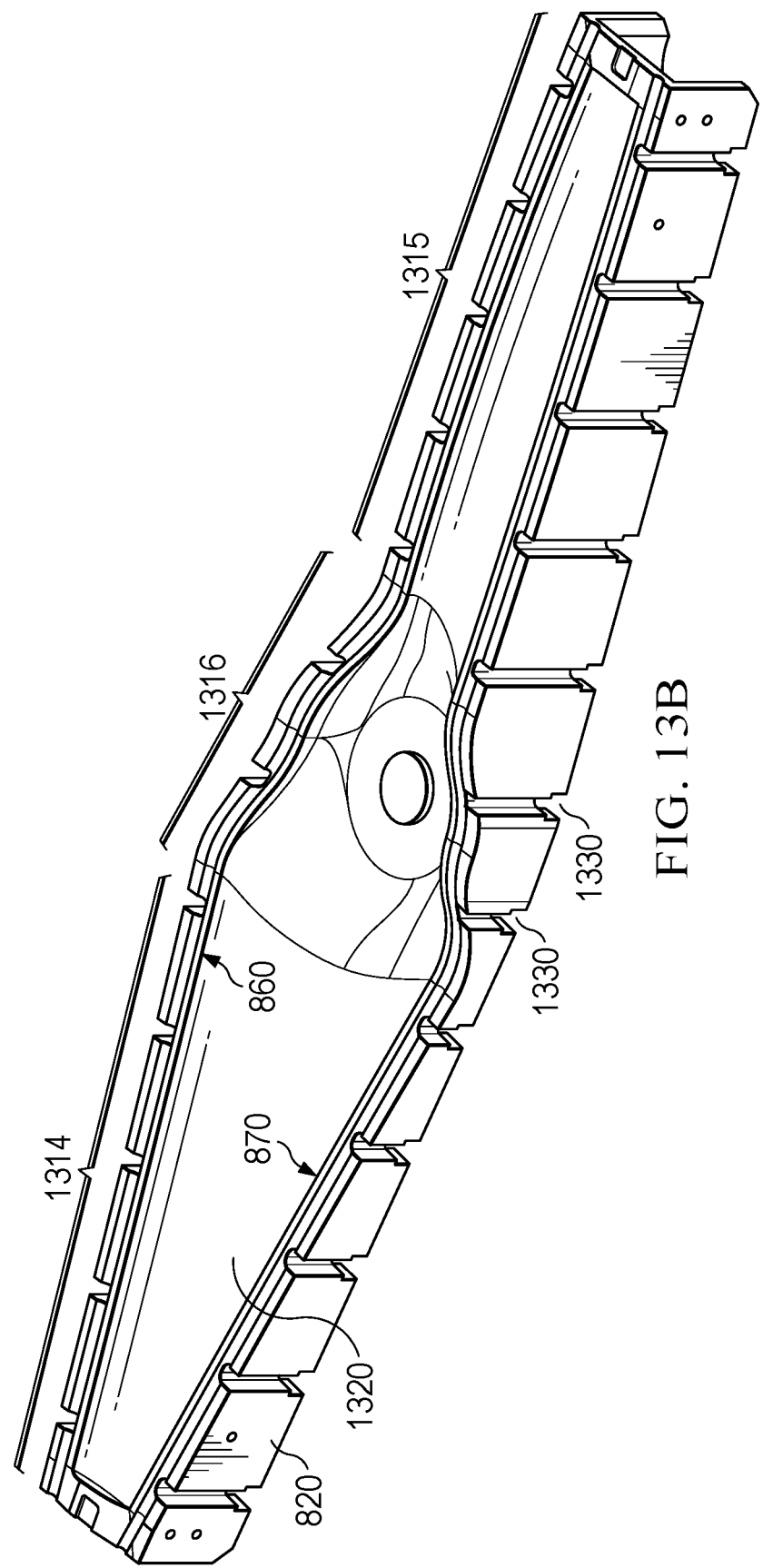
Figure 13C:
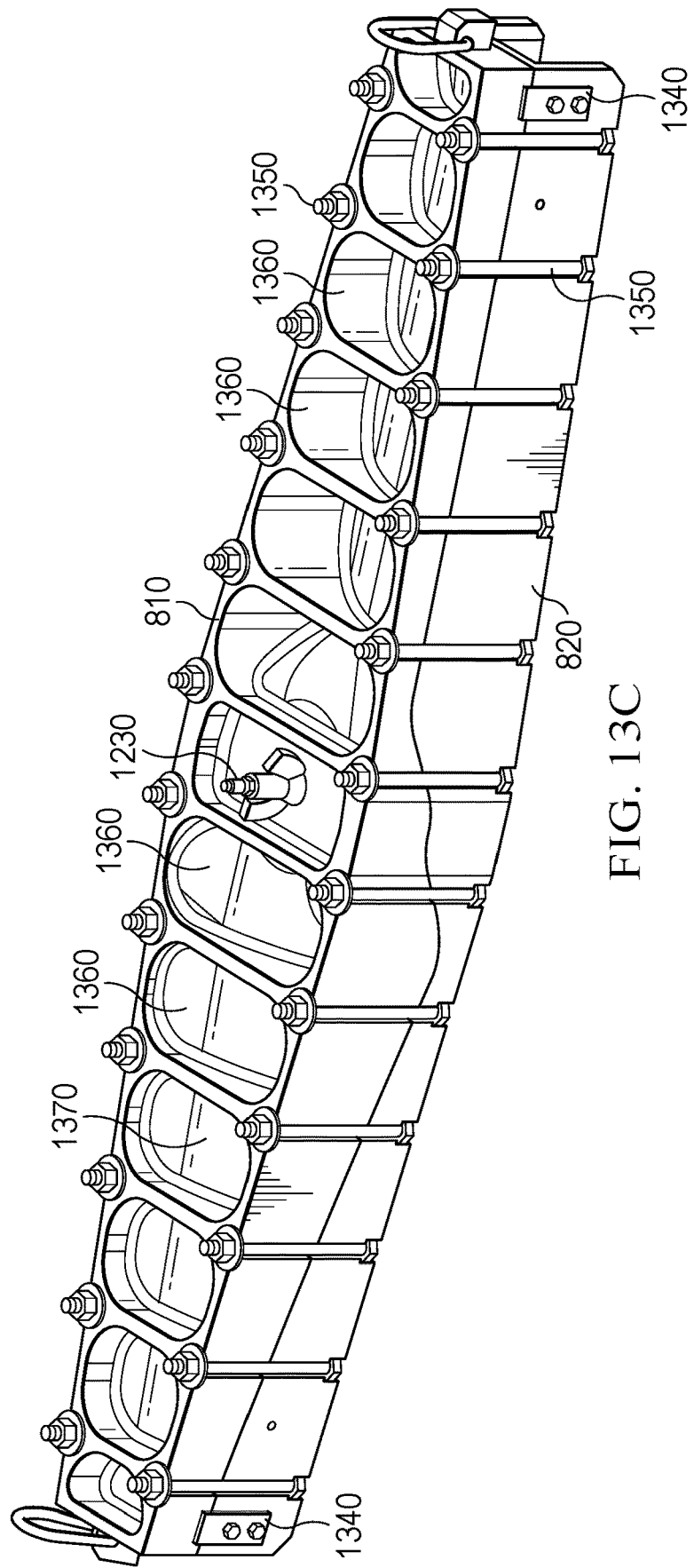

FIGS. 13A-13C illustrate a system 1300 that may be used to manufacture hollow multi-blade rotor 100, according to certain embodiments. System 1300 may include top mold 810 and bottom mold 820. In some embodiments, top mold 810 and bottom mold 820 may be formed from metal (e.g., aluminum, etc.) in order to conduct heat. Top mold 810 includes an upper contoured surface 1310. Upper contoured surface 1310 is a continuous surface for forming a top surface of hollow multi-blade rotor 100. In some embodiments, upper contoured surface 1310 includes a first region 1311, a second region 1312, and a third region 1313. First region 1311 is shaped to form an upper surface of a first hollow blade 110 (i.e., a fixed-pitch hollow blade with a leading edge and a trailing edge). Second region 1312 is shaped to form an upper surface of a second hollow blade 110 (i.e., a fixed-pitch hollow blade with a leading edge and a trailing edge). Third region 1313 is shaped to form an upper surface of hollow hub area 120 and may include a central aperture 1211 as illustrated. Central aperture 1211 may be configured to allow pressure port 1230 of inflatable bladder 850 to protrude out of top mold 810.

In some embodiments, lower contoured surface 1320 includes a fourth region 1314, a fifth region 1315, and a sixth region 1316. Fourth region 1314 is shaped to form a lower upper surface of the first hollow blade 110 (i.e., a fixed-pitch hollow blade with a leading edge and a trailing edge). Fifth region 1315 is shaped to form a lower surface of the second hollow blade 110 (i.e., a fixed-pitch hollow blade with a leading edge and a trailing edge). Sixth region 1316 is shaped to form a lower surface of hollow hub area 120.

In some embodiments, top mold 810 and bottom mold 820 each include a plurality of coupler grooves 1330 as illustrated. Each coupler groove 1330 may be configured to accept a coupling bolt 1350. As illustrated in FIG. 13C, coupling bolts 1350 may be used to secure top mold 810 to bottom mold 820 together during the heating/curing process of hollow multi-blade rotor 100. In some embodiments, coupler grooves 1330 are arranged around perimeters of top mold 810 and bottom mold 820 as illustrated. Coupler grooves 1330 of top mold 810 are aligned with coupler grooves 1330 of bottom mold 820 when top mold 810 is placed on bottom mold 820. While a specific number and arrangement of coupler grooves 1330 are illustrated, any appropriate number and arrangement of coupler grooves 1330 may be used.

In some embodiments, system 1300 includes one or more alignment plates 1340 as illustrated in FIG. 13C. Each alignment plate 1340 is configured to attach to one or both of top mold 810 and bottom mold 820 in order to align top mold 810 and bottom mold 820 when the molds are coupled together. In some embodiments, alignment plate 1340 is a thin metal strip that is coupled to bottom mold 820 and protrudes above bottom mold 820 in order to contact and align top mold 810 to bottom mold 820.

In some embodiments, the undersides of top mold 810 and bottom mold 820 each include multiple pockets 1360, as illustrated. Pockets 1360 are cut-away areas of top mold 810 and bottom mold 820 that expose an underside 1370 of upper contoured surface 1310 and an underside of lower contoured surface 1320 (not illustrated) to heat applied to system 1300 (e.g., during curing). Pockets 1360 help reduce the time and energy required to heat system 1300 to a desired temperature during the curing process.

In some embodiments, system 1300 includes one or more electrical heating elements (not illustrated) that may be used to heat system 1300 during the curing process. In some embodiments, the heating elements may be coupled or otherwise attached to an outer surface of one or both of top mold 810 and bottom mold 820. In some embodiments, the heating elements may be embedded within one or both of top mold 810 and bottom mold 820. In addition, some embodiments may include one or more wired or wireless sensors for monitoring the temperature of system 1300 during the curing process. In some embodiments, the sensors may be coupled or otherwise attached to an outer surface of one or both of top mold 810 and bottom mold 820. In some embodiments, the sensors may be embedded within one or both of top mold 810 and bottom mold 820.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "member," "module," "device," "unit," "component," "element," "mechanism," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A hollow multi-blade rotor comprising:
   a hollow hub area configured to couple the hollow multi-blade rotor to a motor, the hollow hub area comprising:
   a main hub aperture; and
   a plurality of bolt apertures;
   a plurality of hollow blades; and
   an internal hollow cavity that runs continuously through the plurality of hollow blades and the hollow hub area, wherein the hollow hub area and the plurality of hollow blades are a single member; and
   a plurality of edge layups internal to the hollow multi-blade rotor, wherein the plurality of edge layups includes a first edge layup disposed adjacent, at least in part, to a leading edge of a first hollow blade of the plurality of hollow blades and adjacent, at least in part, to a trailing edge of a second hollow blade of the plurality of hollow blades, and a second edge layup disposed adjacent, at least in part, to a trailing edge of the first hollow blade of the plurality of hollow blades and adjacent, at least in part, to a leading edge of the second hollow blade of the plurality of hollow blades.

2. The hollow multi-blade rotor of claim 1, wherein the internal hollow cavity is devoid of any filler material and instead is filled with air.

3. The hollow multi-blade rotor of claim 1, wherein the first hollow blade is a first hollow fixed-pitch blade, and wherein the second hollow blade of the plurality of hollow blades is
   a second hollow fixed-pitch blade.

4. The hollow multi-blade rotor of claim 3, wherein the first edge layup includes a single-piece first edge layup, the single-piece first edge layup comprising:
   a first end portion that is adjacent to the leading edge of the first hollow fixed-pitch blade; and
   a second end portion that is adjacent to the trailing edge of the second hollow fixed-pitch blade; and
   wherein the second edge layup includes a single-piece second edge layup, the single-piece second edge layup comprising:

a first end portion that is adjacent to the leading edge of the second hollow fixed-pitch blade; and a second end portion that is adjacent to the trailing edge of the first hollow fixed-pitch blade.

5. The hollow multi-blade rotor of claim 4, further comprising a trailing edge filler that is located:

internal to the hollow multi-blade rotor;

outside the internal hollow cavity, and between the trailing edges of the first and second hollow fixed-pitch blades and the second end portions of the first and second edge layups.

6. The hollow multi-blade rotor of claim 1, wherein each of the hollow blades include a top portion and a bottom portion that are molded together to form each of the hollow blades.

7. The hollow multi-blade rotor of claim 1, wherein the main hub aperture has a circular shape.

8. The hollow multi-blade rotor of claim 1, wherein the configuration of the hollow hub area to couple the hollow multi-blade rotor to a motor incudes configuration of the hollow hub area to attach to an upper hub fitting and a lower hub fitting.

9. The hollow multi-blade rotor of claim 8, wherein the main aperture includes an outside portion configured to contact the upper hub fitting and an inside portion configured to contact the lower hub fitting.

\* \* \* \* \*